United States Patent
Fuchs et al.

(10) Patent No.: US 11,354,179 B2
(45) Date of Patent: *Jun. 7, 2022

(54) SYSTEM, METHOD AND COMPUTER PROGRAM PRODUCT FOR SHARING INFORMATION IN A DISTRIBUTED FRAMEWORK

(71) Applicant: Stragent LLC, Longview, TX (US)

(72) Inventors: Axel Fuchs, Richmond, CA (US); Scott Sturges Andrews, Petaluma, CA (US)

(73) Assignee: Stragent, LLC, Longview, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/387,988

(22) Filed: Jul. 28, 2021

(65) Prior Publication Data

US 2021/0357276 A1 Nov. 18, 2021

Related U.S. Application Data

(63) Continuation of application No. 16/042,159, filed on Jul. 23, 2018, now Pat. No. 11,188,400, which is a (Continued)

(51) Int. Cl.
*G06F 9/54* (2006.01)
*H04L 43/04* (2022.01)
*H04L 43/06* (2022.01)
*H04L 43/08* (2022.01)
*H04L 67/02* (2022.01)
(Continued)

(52) U.S. Cl.
CPC .......... *G06F 9/546* (2013.01); *B60R 16/0231* (2013.01); *G06F 9/54* (2013.01); *G06F 9/542* (2013.01); *G06F 9/545* (2013.01); *H04L 43/04* (2013.01); *H04L 43/06* (2013.01); *H04L 43/08* (2013.01); *H04L 43/10* (2013.01); *H04L 67/02* (2013.01); *H04L 67/10* (2013.01); (Continued)

(58) Field of Classification Search
None
See application file for complete search history.

(56) References Cited

U.S. PATENT DOCUMENTS

| 4,099,255 A | 7/1978 | Stanley et al. |
| 5,202,887 A | 4/1993 | Ueno et al. |

(Continued)

FOREIGN PATENT DOCUMENTS

| EP | 1355456 A1 | 10/2003 |
| EP | 1355458 B1 | 9/2005 |
| WO | 2002054163 A1 | 7/2002 |

OTHER PUBLICATIONS

IPR2017-01503 (Final Written Decision, published Dec. 6, 2018).
(Continued)

*Primary Examiner* — Charles E Anya
(74) *Attorney, Agent, or Firm* — Patrick E. Caldwell, Esq.; The Caldwell Firm, LLC

(57) ABSTRACT

A system, method and computer program product are provided for receiving information associated with a message, issuing a storage resource request in connection with a storage resource and determining whether the storage resource is available. In use, the information is capable of being shared in less than one second, utilizing an automotive electronic control unit which includes a plurality of interfaces.

27 Claims, 17 Drawing Sheets

Related U.S. Application Data continuation of application No. 15/919,201, filed on Mar. 12, 2018, now Pat. No. 10,031,790, which is a continuation of application No. 15/405,110, filed on Jan. 12, 2017, now Pat. No. 10,002,036, which is a continuation of application No. 14/011,705, filed on Aug. 27, 2013, now Pat. No. 9,575,817, which is a continuation of application No. 13/531,319, filed on Jun. 22, 2012, now Pat. No. 8,566,843, which is a continuation of application No. 12/182,570, filed on Jul. 30, 2008, now Pat. No. 8,209,705, which is a continuation of application No. 10/737,690, filed on Dec. 15, 2003, now Pat. No. 7,802,263.

(60) Provisional application No. 60/434,018, filed on Dec. 17, 2002.

(51) Int. Cl.
| | | |
|---|---|---|
| *H04L 67/12* | (2022.01) | |
| *B60R 16/023* | (2006.01) | |
| *H04L 43/10* | (2022.01) | |
| *H04L 67/10* | (2022.01) | |
| *H04L 65/102* | (2022.01) | |

(52) U.S. Cl.
CPC ........ *H04L 67/12* (2013.01); *G06F 2209/547* (2013.01); *H04L 65/102* (2013.01)

(56) References Cited

U.S. PATENT DOCUMENTS

| | | |
|---|---|---|
| 5,469,150 A | 11/1995 | Sitte |
| 5,588,002 A | 12/1996 | Kawanishi et al. |
| 5,794,164 A | 8/1998 | Beckert et al. |
| 5,854,454 A | 12/1998 | Upender et al. |
| 5,956,489 A | 9/1999 | Andres et al. |
| 6,034,970 A | 3/2000 | Levac et al. |
| 6,141,710 A | 10/2000 | Miesterfeld |
| 6,289,390 B1 | 9/2001 | Kavner |
| 6,292,862 B1 | 9/2001 | Barrenscheen et al. |
| 6,378,001 B1 | 4/2002 | Aditham et al. |
| 6,434,459 B2 | 8/2002 | Wong et al. |
| 6,484,082 B1 | 11/2002 | Millsap et al. |
| 6,625,169 B1 | 9/2003 | Tofano |
| 6,657,252 B2 | 12/2003 | Fried et al. |
| 6,801,942 B1 | 10/2004 | Dietrich et al. |
| 6,871,250 B2 | 3/2005 | Froeschl et al. |
| 6,934,612 B2 | 8/2005 | Remboski et al. |
| 7,103,045 B2 | 9/2006 | LaVigne et al. |
| 7,103,646 B1 | 9/2006 | Suzuki |
| 7,103,656 B2 | 9/2006 | Lewis et al. |
| 7,552,440 B1 | 6/2009 | Stewart et al. |
| 7,802,263 B2 | 9/2010 | Fuchs et al. |
| 8,209,705 B2 | 6/2012 | Fuchs et al. |
| 8,566,843 B2 | 10/2013 | Fuchs et al. |
| 9,575,817 B2 | 2/2017 | Fuchs et al. |
| 9,705,765 B2 | 7/2017 | Fuchs et al. |
| 10,002,036 B2 | 6/2018 | Fuchs et al. |
| 10,031,790 B1 | 7/2018 | Fuchs et al. |
| 10,248,477 B2 | 4/2019 | Fuchs et al. |
| 2002/0073243 A1 | 6/2002 | Staiger |
| 2002/0124007 A1 | 9/2002 | Zhao |
| 2003/0033067 A1* | 2/2003 | Arita ............... B60R 16/0315 701/48 |
| 2003/0040881 A1 | 2/2003 | Steger et al. |
| 2003/0043739 A1 | 3/2003 | Reinold et al. |
| 2003/0223436 A1 | 12/2003 | Lohrmann et al. |

OTHER PUBLICATIONS

IPR2017-01504 (Final Written Decision, published Dec. 6, 2018).
IPR2017-01519 (Final Written Decision, published Dec. 6, 2018).
IPR2017-01520 (Final Written Decision, published Dec. 6, 2018).
IPR2017-01521 (Final Written Decision, published Dec. 6, 2018).
IPR2017-01522 (Final Written Decision, published Dec. 6, 2018).
IPR2021-00417 (Institution decision, published Jul. 19, 2021).
IPR2021-00418 (Institution Denied, published Jul. 19, 2021).
IPR2021-00419 (Institution Denied, published Jul. 19, 2021).
IPR2021-00425 (Institution Denied, published Jul. 19, 2021).
IPR2021-00426 (Institution Denied, published Jul. 19, 2021).
IPR2021-00427 (Institution Denied, published Jul. 19, 2021).
IPR2021-00726 (Institution Denied, published Oct. 1, 2021).
IPR2021-00727 (Institution Denied, published Oct. 1, 2021).
IPR2021-00728 (Institution Denied, published Oct. 1, 2021).
J. Kershaw "Dependable systems using "Viper"" IET, Conference Nov. 8-10, 1989.
J. Kershaw, "Dependable Systems Using 'Viper'," in Fault Tolerant Design Concepts for Highly Integrated Flight Critica Guidance and Control Systems (1990).
Jagannathan et al. "Blackboard Architectures and Applications," vol. 3, Academic Press Inc., 1989, 524 pages.
Juan Luis Posadas, et al., "Communications Structure for Sensor Fusion in Distributed Real Time Systems," May 2000, Algorithms and Architectures for Real-Time Control 2000: A Proceedings volume from the 6th IFAC Workshop.
Kirrmann et al. "The IEC/IEEE Train Communication Network," IEEE Micro, Mar.-Apr. 2001.
Koopman, Philip "Control Area Network (CAN)" 18-540 Distributed Embedded Systems, Presentation Slides, Oct. 4, 2000.
Leen et al., "Digital networks in the automotive vehicle," Computing and Control Engineering 10(6):257-266, Jan. 2000.
Leen et al. "Expanding Automotive Electronic Systems" Jan. 2002, Computer 35(1).
Mellor-Crummey et al. "Algorithms for Scalable Synchronization on Shared-Memory Multiprocessors," ACM Transactions on Computer Systems, vol. 9, No. 1, Feb. 1991, pp. 21-65.
Nick Grattan and Marshal Brian, "Windows CE 3.0 Application Programming," published Oct. 20, 2000.
OSEK/VDX Network Management Concept and Application Programming Interface, Version 2.51 (May 31, 2000).
Posadas et al. "Communications Structure for Sensory Data in Mobile Robots" 2002 , Engineering Applications of Artificial Intelligence, 15:341-350.
Reinhard Maier, "Event-Triggered Communication on Top of Time-Triggered Architecture," Proceedings of the 21st Digital Avionics Systems Conference, vol. 2, 13.C.5-1-13.C.5-9 (Oct. 27-31, 2002).
SAE International, "Surface Vehicle Recommended Practice—SAE J2366-1" Nov. 2001.
SAE International, "Surface Vehicle Recommended Practice—SAE J2366-2" Nov. 2001.
SAE International, "Surface Vehicle Standard—SAE J1850" Rev May 2001.
SAE, "Its Data Bus—IDB-C Physical Layer" Nov. 2001, Surface Vehicle Recommended Practice, J2366-1.
Schill, John "An Overview of the CAN Protocol," Embedded Systems Programming, Sep. 1997, pp. 46-62.
Stewart et al. "The Chimera II Real-Time Operating System for Advanced Sensor-Based Control Applications" 1992, IEEE Transactions on Systems, Man, and Cybernetics, vol. 22, No. 6.
Stewart et al., "Integration of Real-Time Software Modules for Reconfigurable Sensor-Based Control Systems," Proceedings of the 1992 IEEE/RSJ International Conference on Intelligent Robots and Systems, Jul. 7-10, 1992.
Tanenbaum, Andrew S. "Computer Networks," 3rd Ed., Prentice Hall, Inc, 1996, pp. 1-76 (Introduction).
Tanenbaum, Andrew S. "Modern Operating Systems," 2nd Ed., Prentice Hall, Inc., 2001, excerpts from Chapters 2, 7, 8, and 10.
Upender et al., "Embedded Communication Protocol Options," Proceedings of the Fifth Annual Embedded Systems Conference, vol. 2, Miller Freeman, Inc., 1993.
Volvo Technology Report, "Volcano—a revolution in on-board communications" Feb. 11, 1999.
Wargui et al. "Application of Controller Area Network to Mobile Robots," IEEE, Electrotechnical Conference, May 16, 1996, p. 205-207.

(56) References Cited

OTHER PUBLICATIONS

Wense et al. "Building Automotive LIN Applications," pp. 279-292, found as part of Krueger et al., "Advanced Microsystems for Automotive Applications 2001," Springer, 2001.
William Wong, "Software and Hardware Standards Help, But In-Vehicle Network Growth Will Be Conservative: CAN networks and OSEK/VDX compatible operating systems will drive tomorrow's vehicles," Electronic Design, vol. 49, issue 1, 62 (Jan. 8, 2001).
Case No. EDTX 6:11-cv-00111.
Case No. DEL 1:20-cv-00510.
Case No. DEL 1:20-cv-00511.
Case No. DEL 1:20-cv-00512.
"An Embedded Software Primer," David E. Simon, 1999.
"Application of In-Vehicle Data Buses for Collision Avoidance Systems," William D. Horne, et al., 1998.
"Goals and Motivation: What is OSEK/VDX," OSEK VDX Portal, 2012.
"GSA Guide to Specifying Interoperable Building Automation and Control Systems Using ANSI/ASHRAE Standard 135-1995," Steven T. Bushby et al., Nov. 1999.
"OSEK/VDX Binding Specification Version 1.3," OSEK Group, Sep. 17, 2001.
"OSEK/VDX Binding Specification Version 1.4," OSEK Group, Sep. 6, 2002.
"OSEK/VDX Binding Specification Version 1.4.1," OSEK Group, Jan. 21, 2003.
"OSEK/VDX Communication Specification Version 2.2.2," OSEK Group, Dec. 18, 2000.
"OSEK/VDX Communication Specification Version 3.0," OSEK Group, Jul. 26, 2002.
"OSEK/VDX Communication Specification Version 3.0.1," OSEK Group, Jan. 29, 2003.
"OSEK/VDX Communication Specification Version 3.0.2," OSEK Group, Dec. 9, 2003.
"OSEK/VDX Fault-Tolerant Communication Specification Version 1.0," OSEK Group, Jul. 24, 2001.
"OSEK/VDX Network Management Concept and Application Programming Interface Version 2.5.0," OSEK Group, May 31, 1998.
"OSEK/VDX Network Management Concept and Application Programming Interface Version 2.5.1," OSEK Group, May 31, 2000.
"OSEK/VDX Network Management Concept and Application Programming Interface Version 2.5.2," OSEK Group, Jan. 16, 2003.
"OSEK/VDX OSEK Implementation Language Specification Version 2.3," OSEK Group, Sep. 10, 2001.
"OSEK/VDX OSEK Implementation Language Specification Version 2.4," OSEK Group, Dec. 2, 2002.
"OSEK/VDX OSEK Implementation Language Specification Version 2.4.1," OSEK Group, Jan. 23, 2003.
"OSEK/VDX OSEK Operating System Specification Version 2.0 revision 1," OSEK Group, Oct. 15, 1997.
"OSEK/VDX OSEK Operating System Specification Version 2.1 revision 1," OSEK Group, Nov. 13, 2000.
"OSEK/VDX OSEK Operating System Specification Version 2.2," OSEK Group, Sep. 10, 2001.
"OSEK/VDX OSEK Operating System Specification Version 2.2.1," OSEK Group, Jan. 16, 2003.
"OSEK/VDX OSEK Run Time Interface Part A: Language Specification Version 2.1," OSEK Group, Jul. 16, 2001.

"OSEK/VDX Time-Triggered Operating System Specification Version 1.0," OSEK Group, Jul. 24, 2001.
"Programming in the OSEK/VDX Environment," Joseph Lemieux, 2001.
"The Foundation.TM Fieldbus Primer," Fieldbus Inc., Jun. 24, 2001.
Autosar "Specification of Operating System Interface", release R19-11 (2019).
Autosar Systems "Specification of Operating System Release 4.2.2" 2003.
Berwanger et al "FlexRay—The Communication System for Advanced Automotive Control Systems" 2001-01-0676, SAE 2001 World Congress, Mar. 5-8, 2001.
Bosch, "CAN Specification Version 2.0" Sep. 1991.
Case No. 20-510; 20-511; 50-512.
Clarke et al "Formal Verification of Autonomous Systems NASA Intelligent Systems Program" Carnegie Mellon University, Sep. 25, 2001.
Courtois et al "Concurrent Control with "Readers" and "Writers"" Communications of the ACM, vol. 14, No. 10, Oct. 1971.
Douglas Boling, "Programming Windows CE," published 1998.
Fredriksson, Lars-Berno "Controller Area Networks and the Protocol can for Machine Control Systems" Mechatronics vol. 4, No. 2, pp. 159-172, 1994.
Giusto et al., "Automotive Virtual Integration Platforms: Why's, What's, and How's" Sep. 2002, Proceedings of the 2002 IEEE International Conference on Computer Design: VLSI in Computers and Processors (ICCD'02).
H.C. von der Wense et al. "Advanced Microsystems for Automotive Applications" Springer (2001), p. 280-292.
Hernandez et al. "Algorithms and architectures for real-time control 2000," Proceedings volume from the 6th IFAC Workshop, Palma de Mallorca, Spain, May 15-17, 2000.
Homburg et al. "Automatic Code Generation for Multirate Simulink Models with Support for OSEK Real-Time Operating System," 2001.
IEEE "IEEE Standard for Information Technology—Portable Operating System Interface (POSIX®)—Part 1: System Application Program Interface (API)—Amendment d: Additional Realtime Extensions," IEEE Std 1003.1d-1999 (Amendment to IEEE Std 1003.1-1990), Jun. 16, 2000.
IEEE "The Authoritative Dictionary of IEEE Standards Terms" 7th Ed., IEEE Press, 2000.
Intelligent Transportation Systems Standards, United States Department of Transportation "SAE J2366—Family of ITS Data Bus (IDB) Protocol Standards," (online fact sheet written Jul. 12, 2006), available at https://www.standards.its.dot.gov/Factsheets/PrintFactsheet/56.
International Organization for Standardization 11898, Amendment 1, Apr. 1995.
International Organization for Standardization 11898, First Edition, Nov. 1993.
International Organization for Standardization 11898-1, First Edition, Dec. 2003.
IPR2017-00457 (Final Written Decision, published Jun. 13, 2018).
IPR2017-00458 (Final Written Decision, published Jun. 13, 2018).
IPR2017-00676 (Final Written Decision, published Jun. 14, 2018).
IPR2017-00677 (Final Written Decision, published Jun. 13, 2018).
IPR2017-01502 (Final Written Decision, published Dec. 6, 2018).

* cited by examiner

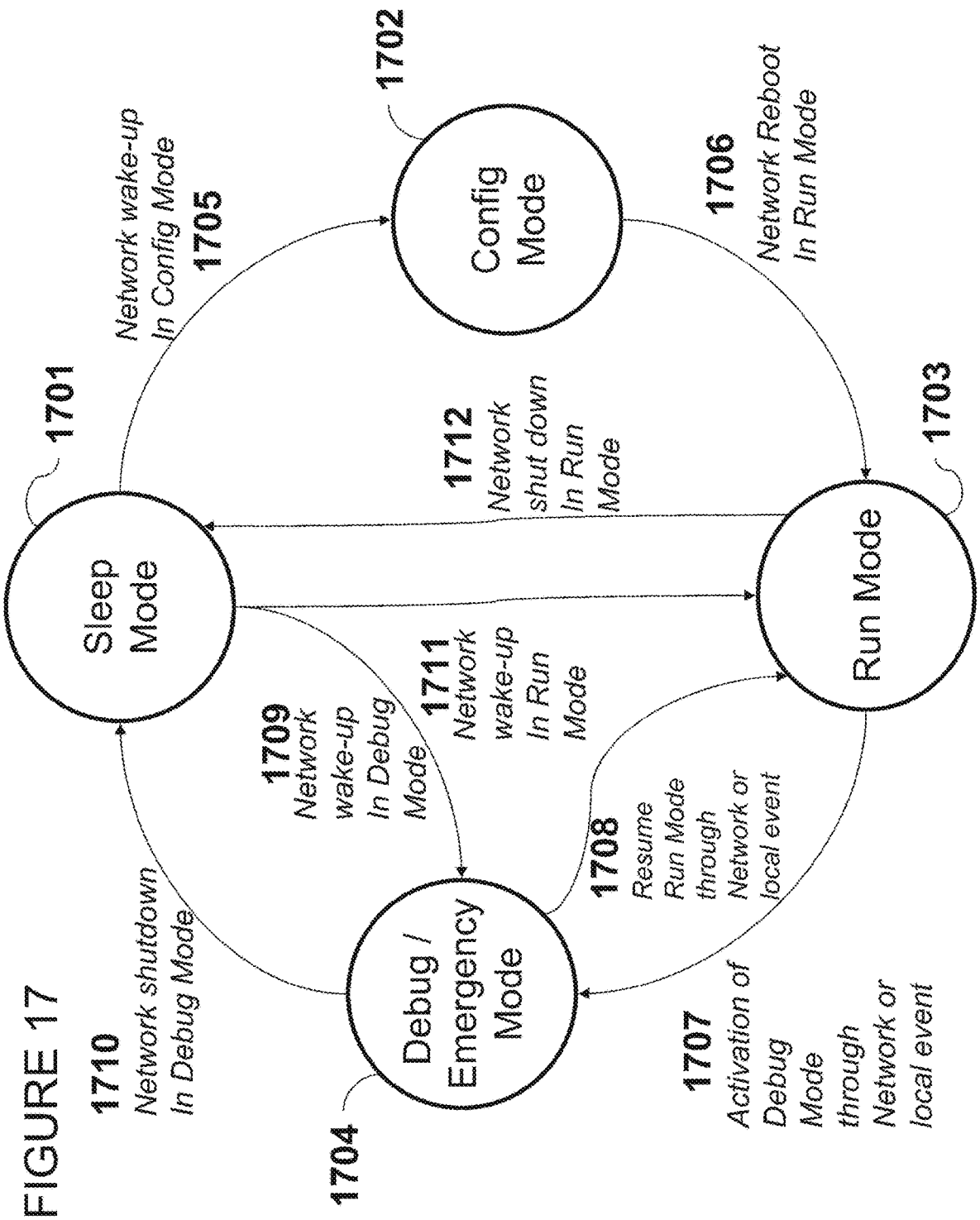

SYSTEM, METHOD AND COMPUTER PROGRAM PRODUCT FOR SHARING INFORMATION IN A DISTRIBUTED FRAMEWORK

RELATED APPLICATION(S)

This application is a continuation of U.S. patent application Ser. No. 16/042,159 filed Jul. 23, 2018, which is a continuation of U.S. patent application Ser. No. 15/919,201 filed Mar. 12, 2018, now U.S. Pat. No. 10,031,790, which is a continuation of U.S. patent application Ser. No. 15/405,110 filed Jan. 12, 2017, now U.S. Pat. No. 10,002,036, which is continuation of U.S. patent application Ser. No. 14/011,705 filed Aug. 27, 2013, now U.S. Pat. No. 9,575,817, which is a continuation of U.S. patent application Ser. No. 13/531,319 filed Jun. 22, 2012, now U.S. Pat. No. 8,566,843, which is a continuation of U.S. patent application Ser. No. 12/182,570 filed Jul. 30, 2008, now U.S. Pat. No. 8,209,705, which is a continuation of U.S. patent application Ser. No. 10/737,690 filed Dec. 15, 2003, now U.S. Pat. No. 7,802,263, which, in turn, claims priority under 35 U.S.C. § 119 based on U.S. Provisional Application No. 60/434,018 filed Dec. 17, 2002, all of which are incorporated herein by reference.

FIELD AND BACKGROUND OF THE INVENTION

The present invention relates to the field of distributed control and monitoring systems that may include certain temporal behavior.

Such technology may optionally apply to electronic vehicle communication and control systems, real-time monitoring systems, industrial automation and control systems, as well as any other desired system.

SUMMARY OF THE INVENTION

A system, method and computer program product are provided for sharing information in a distributed system. After information is received, it is stored on a bulletin board. In use, the information is shared, in real-time, among a plurality of heterogeneous processes.

In one embodiment, both past and present instances of the information may be stored on the bulletin board. As an option, the information may be replicated among a plurality of the bulletin boards. Optionally, first information may be processed utilizing a first bulletin board and stored utilizing a second bulletin board. Still yet, the bulletin boards may be hierarchical.

In another embodiment, the processes may access multiple sections of the bulletin board. Further, the bulletin board may send notifications to the processes based on a state of the information on the bulletin board.

Optionally, the information may include variables. For example, the information may include input variables, output variables, etc. Moreover, the processes may include local processes, remote processes, etc. Still yet, the processes may include event triggered processes and/or time triggered processes. In use, each of the processes may process the information in a manner that is isolated from temporal characteristics associated with the network.

In still another embodiment, the information may be extracted from a message received by a bulletin board manager. Moreover, the information may be converted from a signal received by a bulletin board manager. Even still, the information may be shared in a single task, may be shared according to a schedule, and/or may be shared with an operating system. Optionally, dynamic preemptive scheduling may be provided. Also, the information may be shared across the communication network with only a portion of a message header that is needed for a specific communication link while other communication links may use a different message header.

As a further option, resources in the network may be protected. Specifically, the resources in the network may be protected utilizing a schedule that allows information sharing utilizing the bulletin board. In another embodiment, the resources in the network may be protected utilizing semaphores.

In even still another embodiment, the information may be shared according to an internal clock, an external clock, etc. During operation, objects may be generated based on a change of state of the information stored in the bulletin board. Such objects may include, but are not limited to flags, events, signals, interrupts, etc. Still yet, the information may be stored in response to interrupts associated with the processes.

In use, the bulletin board may update the processes with information at a first rate that differs from a second rate with which the processes send the information to the bulletin board. Optionally, the bulletin board may be accessed with guaranteed access times, jitter, and bandwidth.

In addition, the bulletin board may be updated irregularly and triggered by internal or external objects including, but not limited to flags, events, signals, interrupts, etc. Event triggers may be provided independent of a link connection between nodes where the processes are carried out. Moreover, failure redundancy may be provided through multiple independent links across diverse physical connections.

As yet another option, the information may have a user-configured constraint associated therewith. Such constraint may include a memory constraint, a real-time constraint, etc. As a further option, the constraint may be configured utilizing a tool. In one embodiment, a system is provided, comprising: an automotive electronic control unit including a memory storage comprising instructions, and at least one hardware processor in hardwired communication with the memory storage, wherein the at least one hardware processor executes the instructions for: receiving sensor information associated with a message; in response to receiving the sensor information, issuing, by the at least one hardware processor and to a storage resource included in the automotive electronic control unit, a storage resource request to access the storage resource included in the automotive electronic control unit to store the sensor information and, in response to issuing the storage resource request, determining whether the storage resource is available to store the sensor information; determining whether a threshold tracked since the issuance of the storage resource request has been reached indicating that the storage resource has not been available in association with the threshold tracked since the issuance of the storage resource request; when the storage resource included in the automotive electronic control unit is determined, in response to issuing the storage resource request, to not be available and the threshold tracked since the issuance of the storage resource request has not been reached indicating that the storage resource has not been available in association with the threshold tracked since the issuance of the storage resource request, issuing, by the at least one hardware processor to the storage resource included in the automotive electronic control unit, another storage resource request to access the storage resource included in the automotive electronic control unit to store the sensor information; when the storage resource included in the automotive electronic control unit is determined, in response to issuing the storage resource request or the another storage resource request, to not be available and the threshold tracked since the issuance of the storage resource request has been reached, sending an error notification; and when the storage resource included in the automotive electronic control unit is determined, in response to issuing the storage resource request or the another storage resource request, to be available, storing the sensor information utilizing the storage resource; wherein the automotive electronic control unit is operable such that the sensor information is capable of being shared in less than one second, and the automotive electronic control unit includes a plurality of interfaces including: a first interface; and a second interface for interfacing with a network, where the network is at least one of a Controller Area Network, a Flexray network, or a Local Interconnect Network.

In one embodiment, an apparatus is provided, comprising: an automotive electronic control unit including a memory storage comprising instructions, and at least one hardware processor in hardwired communication with the memory storage, wherein the at least one hardware processor executes the instructions for: identifying sensor information associated with a message received utilizing a first network protocol associated with a first network; in response to identifying the sensor information, issuing, by the at least one hardware processor and to a storage resource included in the automotive electronic control unit, a storage resource request to access the storage resource included in the automotive electronic control unit to store the sensor information and, in response to issuing the storage resource request, determining whether the storage resource is available to store the sensor information; determining whether a threshold tracked since the issuance of the storage resource request has been reached indicating that the storage resource has not been available in association with the threshold tracked since the issuance of the storage resource request; in the event the storage resource included in the automotive electronic control unit is determined, in response to issuing the storage resource request, to not be available and the threshold tracked since the issuance of the storage resource request has not been reached indicating that the storage resource has not been available in association with the threshold tracked since the issuance of the storage resource request, issuing, by the at least one hardware processor to the storage resource included in the automotive electronic control unit, another storage resource request to access the storage resource included in the automotive electronic control unit to store the sensor information; in the event the storage resource included in the automotive electronic control unit is determined, in response to issuing the another storage resource request, to not be available and the threshold tracked since the issuance of the storage resource request has been reached, sending an error notification; and in the event the storage resource included in the automotive electronic control unit is determined, in response to issuing the storage resource request or the another storage resource request, to be available, storing the sensor information utilizing the storage resource; wherein the apparatus is operable such that the sensor information is capable of being shared in less than one second utilizing a second network protocol associated with a second network, and the automotive electronic control unit remains in hardwired communication with the first network and the second network and includes: a first interface for interfacing with the first network, the first interface including a first interface-related data link layer component for using first network-related data link layer header bits and a first interface-related network layer component for using first network-related network layer header bits, where the first network is at least one of a Controller Area Network type, a Flexray network type, or a Local Interconnect Network type; and a second interface for interfacing with the second network, the second interface including a second interface-related data link layer component for using second network-related data link layer header bits and a second interface-related network layer component for using second network-related network layer header bits, where the second network is at least one of the Controller Area Network type, the Flexray network type, or the Local Interconnect Network type.

BRIEF DESCRIPTION OF THE DRAWINGS

FIG. 17 is a state transition diagram of an embodiment of the mode switching method of one embodiment.

DETAILED DESCRIPTION

Figure 1:
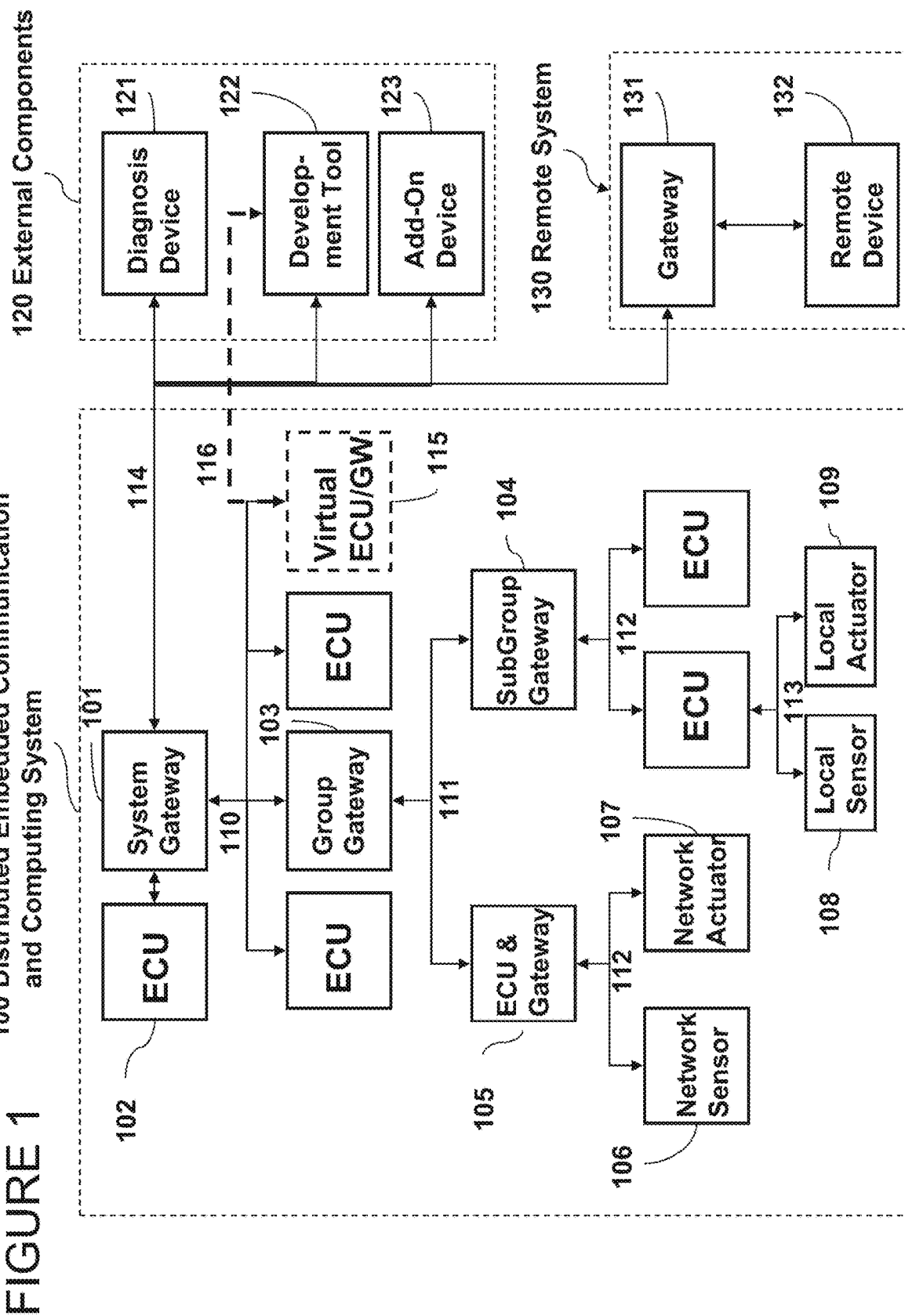
FIG. 1 is a block diagram of an embodiment of a system of one embodiment.

FIG. 1 is a block diagram generally depicting elements of an embodiment of the present distributed embedded communication and computing system. The system architecture may be situated in automotive electronics or industrial control and monitoring systems. In an automotive environment, the various Electronic Control Units (ECUs, 102) control complex applications such as engine control, brake control, or diagnostics. They are either connected to sensors and actuators via discrete links or simple standard functions such as sensors and actuators are organized into separate sub networks.

These complex functions such as braking, engine-control, etc. are then grouped into the backbone system functions for the car, such as body control, power train and chassis. The backbone also includes the vehicle's high level functions such as diagnostics, telematics and entertainment systems.

Therefore the system is typically hierarchically organized and includes a variety of gateways (101, 104, 105), which relay messages up and down through the system layers. Each layer may contain multiple electronic control units (ECU, 102) that are connected through wired serial multiplexing bus-systems such as Controller Area Network (CAN or ISO11898), Flexray, LIN, J1850, J1708, MOST, IEEE1394, and other similar serial multiplexing buses or through wireless multiplexing systems such as IEEE802.11, IEEE802.15, Bluetooth, Zigbee, or similar other wireless links.

Typically, functions provided by an ECU (102) are bound to hard real-time temporal behavior. In the context of the present description, real-time may include any response time that may be measured in milli- or microseconds, and/or is less than 1 second.

The ECU may receive a set of real-time input variables from local sensors (108), which are connected via discrete signal lines (113), or from networked sensors (106), which are connected through a multiplexing bus-system (112). The ECU may also share variables with other ECUs (102) that are either connected on the same physical multiplexing bus or that it can reach through a gateway (101, 103, 104).

Then the ECU (102) processes the input variables and generates a set of output variables that are either shared with other ECUs (102) as described above, or which are output to local actuators (109), which are connected via discrete signal lines (113), or to networked actuators, which are connected through a multiplexing bus (112). ECUs (102) typically share information with devices that are connected on the same physical multiplexing system. This method of information sharing is called horizontal information sharing in a hierarchical system. Gateways (101, 103, 104) link multiple physical multiplexing systems together. In the context of the present description, such information may include data, a signal, and/or anything else capable of being stored and shared.

The highest level in the hierarchical system is the system level. The system level gateway (101) may be connected to ECUs on the system level multiplexing bus (117), to subsequent gateways (103) that also link to subsequent communication buses (110), and to external components (120) that may contain diagnostics devices (121), development tools (122), other add-on devices (123) or other instances of distributed embedded communication and computing systems (100). In addition, the system gateway (101) may also be connected to an external gateway (131) that may link the system to a remote device (132) through wireless or wired wide-area-networks such as the Internet, using standard protocols such as UDP/IP, TCP/IP, RTP, HTTP, SOAP, JAVA, etc. or nonstandard proprietary protocols.

Subsequent to the system level may be several layers of groups and subgroups that are link to the higher levels via gateways (101, 103, 104, 105).

During the design-time of the system, not all ECUs may exist. Therefore, the development tool (122) may provide a plug-in component or virtual ECU/GW (115) that directly links into the wired multiplexing bus or wireless network (110) and also allows for separate control functions via a tool-link (116).

Figure 2:
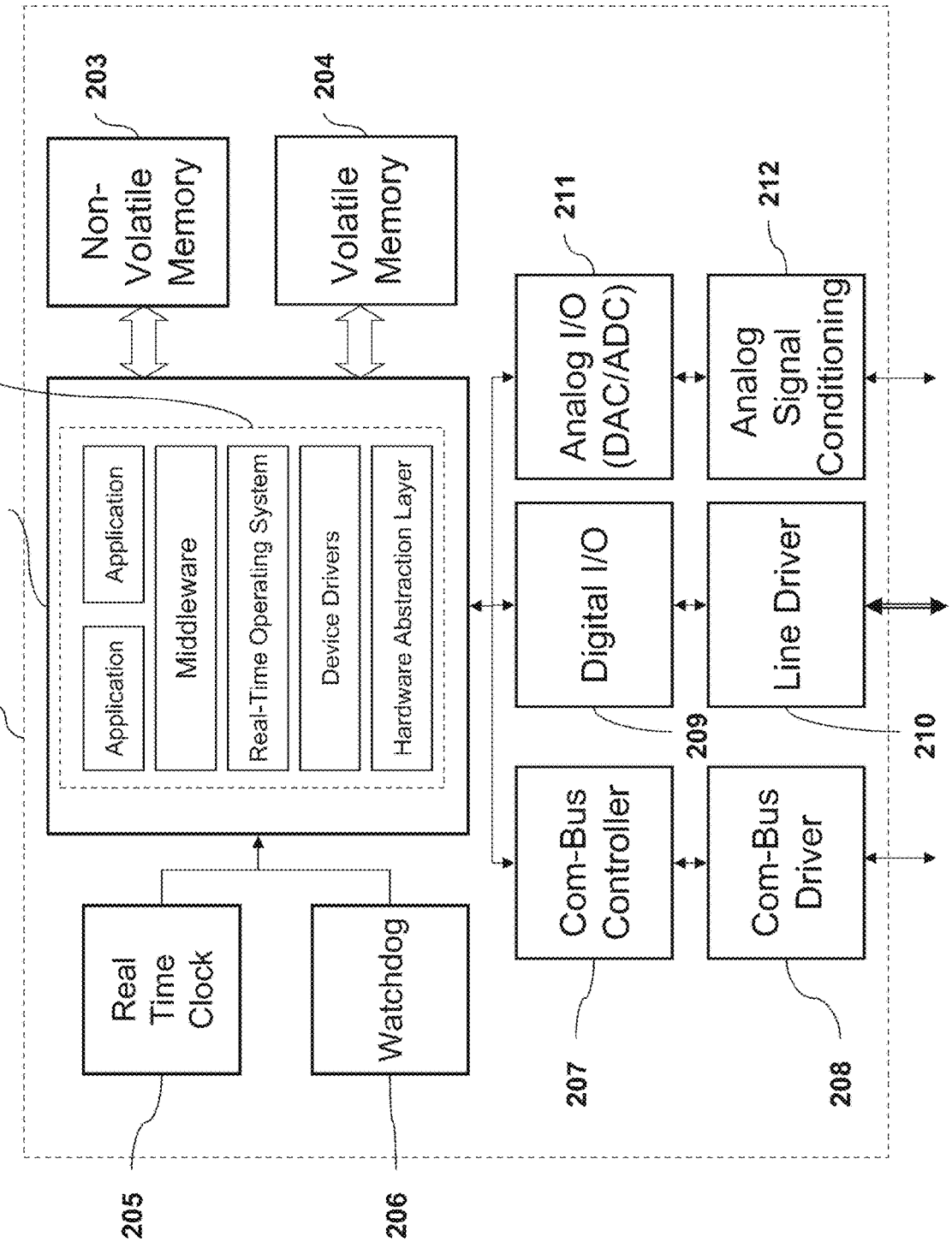
FIG. 2 is a block diagram generally depicting an embodiment of an ECU as part of the system illustrated in FIG. 1.

The block diagram in FIG. 2 depicts the detailed elements within a generic ECU (200) that is one embodiment of ECU (102). The ECU (200) typically contains a micro-processor (201), volatile memory (204) such as RAM, S-RAM or similar, non-volatile memory (203) such as EEPROM, FLASH, etc., a real time clock for internal timing of processes (205), a watchdog (206) to maintain the health of the system, one or more communication bus controllers (207) with associated drivers (208), digital I/O (209) with line drivers (210), and analog I/O (211) with associated analog signal conditioning (212).

Figure 3:
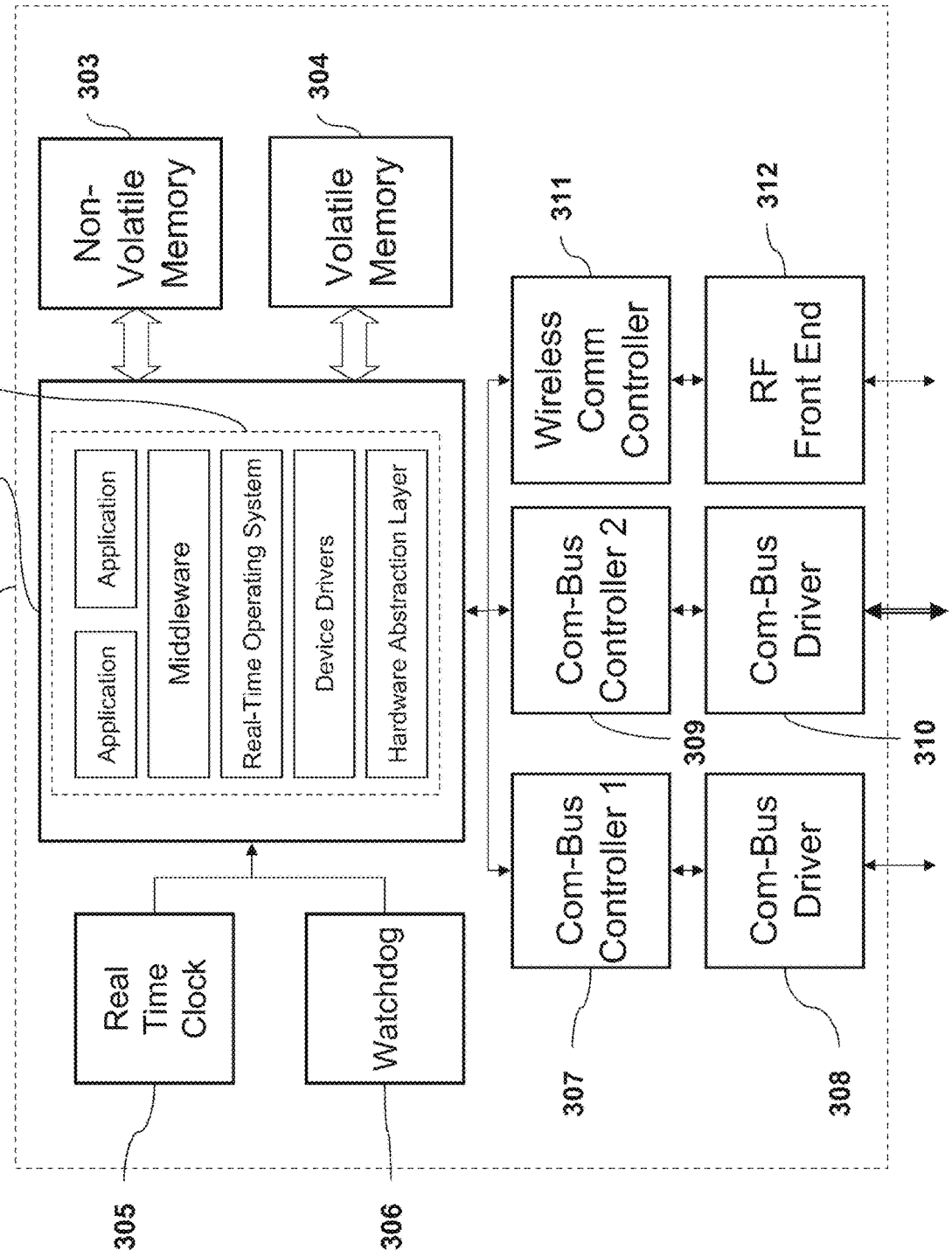
FIG. 3 is a block diagram generally depicting an embodiment of a Gateway device as part of the system illustrated in FIG. 1.

In an alternate embodiment, the ECU (200) may also contain a wireless communication controller (311) and a RF-Front-end (312) as outlined in FIG. 3. The software (202) can either be stored in local non-volatile memory (203) or partially downloaded via the communication link (207, 208) and stored in the volatile memory. The software is then executed in the microprocessor (201).

The block diagram FIG. 3 depicts the detailed elements within a generic gateway (300) that is one embodiment of Gateway (101, 103, 104, 105) in FIG. 1.

Figure 4:
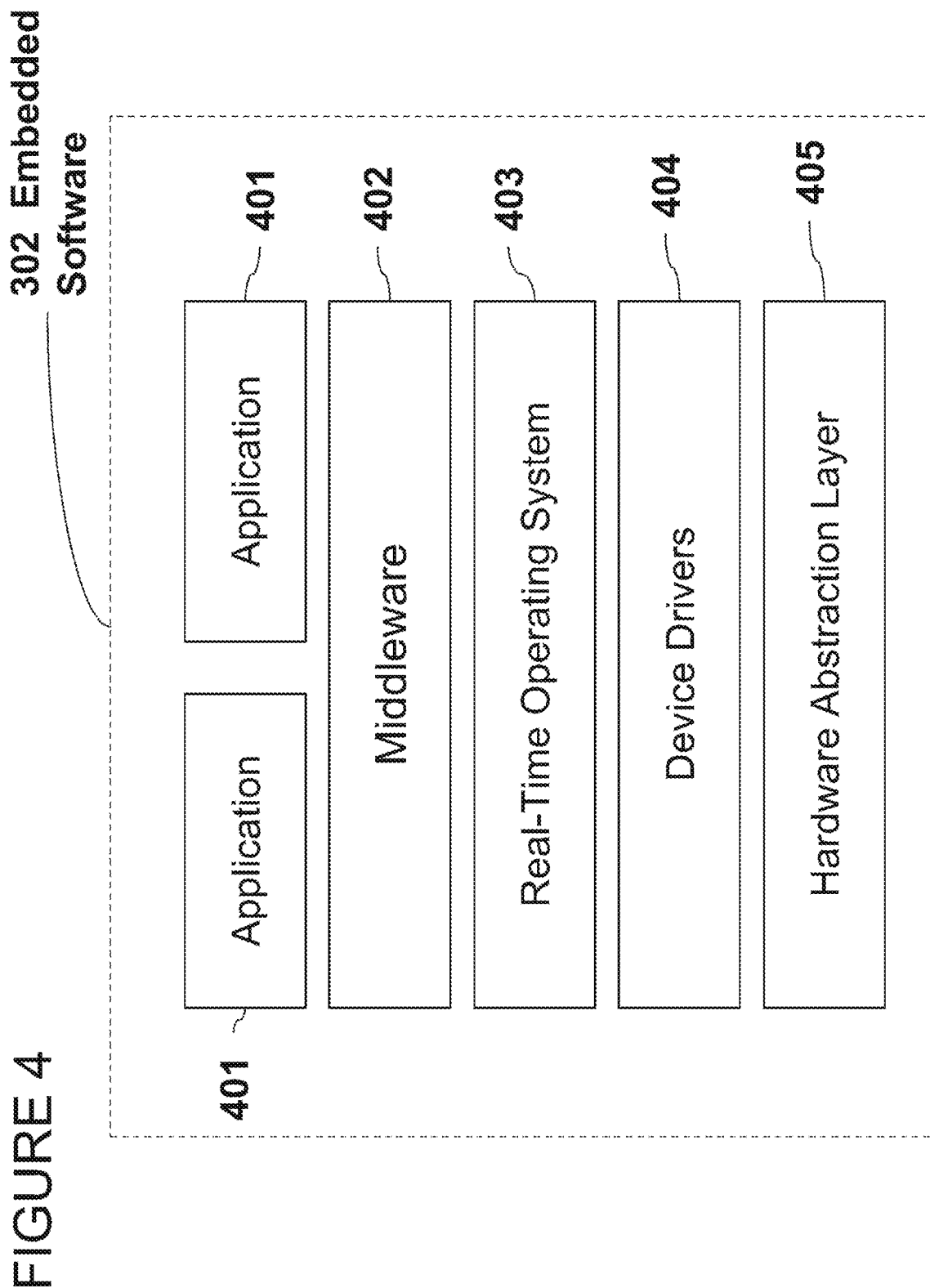
FIG. 4 is a block diagram of an embodiment of the software architecture assumed for one embodiment.

FIG. 4 outlines one embodiment of the software architecture in an embedded system. The hardware abstraction layer (405) allows the system developer to adapt a standard operating system to a specific hardware as used in an ECU (200) or gateway (300). The hardware abstraction layer (405) adapts the real-time operating system (403) and the device drivers (404) to a specific hardware implementation.

One embodiment includes the middleware (402) that has direct access to the real-time operating system (403), the device drivers (404) and the hardware abstraction layer (405). The middleware isolates the application from input/output functions and allows multiple applications to share common variables locally. In addition, the middleware lets applications share variables with remote applications/processes. In the context of the present description, a process may refer to any hardware and/or software operation, etc.

In one embodiment, the middleware can directly interface with the input/output mechanisms of the hardware without utilizing an operating system (403) or hardware abstraction layer (405).

Another embodiment of the middleware utilizes a pre-emptive multitasking operating system with explicit control of resources. In an alternate embodiment, the middleware can be built with a static multitasking scheme with implicit resource management or be part of a single task system.

Figure 5:
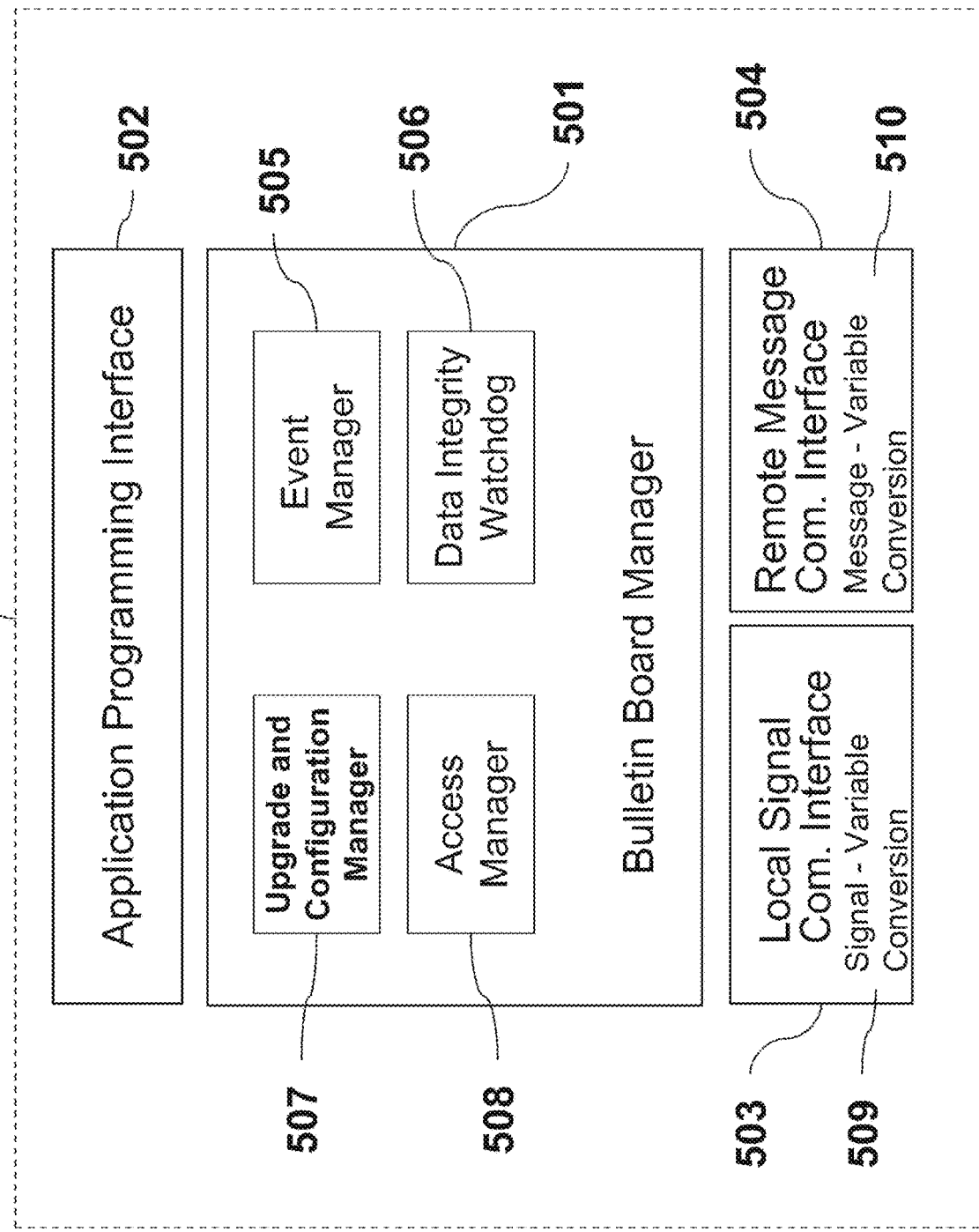
FIG. 5 is a block diagram of an embodiment of the middleware that contains the methods of one embodiment.

Referring now to FIG. 5, the middleware (402) contains the bulletin board manager (501), a local signal communication interface (503), a remote message communication interface (504), and an application programming interface (502). The application interface (502) provides methods and data interfaces to a plurality of applications. In one embodiment, the application interface is an object library that can be linked to an application at design time.

The bulletin board manager (501) contains an upgrade and configuration manager (507), an event manager (505), a data access manager (508), and a data integrity watchdog (506). The upgrade and configuration manager (507) is necessary to configure the data structure of the bulletin board and to make executable code available to individual processing nodes. In the context of the present description, the bulletin board may refer to any database that enables users to send and/or read electronic messages, files, and/or other data that are of general interest and/or addressed to no particular person/process.

The access manager provides access control mechanisms for the code update and configuration mode. It also may control access rights for individual applications at execution time in the run mode.

The event manager (505) captures input-output events as variables and generates new events, flags, or signals based on operations on state variables in the bulletin board. Such operations may include test of maximum values, the occurrence of logically combined events, the result of an integrity check, or events and signals that are created based on any other logical or arithmetic computation on the state variables that are stored in the bulletin board. The actual processing of data and manipulation of data may be done in the application that uses the middleware (402). The data integrity watchdog analyses the stored state variables for its integrity and generates events or flags if any problem occurs.

The local signal communication interface (503) interfaces with the local discrete input/output hardware to update the bulletin board with new variables and to update the input/output interfaces with the state variables from the bulletin board. It also converts state variables to input/output signals and input/output signals to state variables that can be stored in the bulletin board. The conversion process may contain scaling of signals as well as offset compensation. Typically this processing helps to convert I/O signals that are measured in Volt to a physical entity and vice versa. The communication with the local discrete input output system can be triggered by events or signals can be sampled time-triggered based on a cyclic global or local time base.

The remote message communication interface (504) interfaces to serial multiplexing interfaces (buses) that are connected to the specific processing node (ECU or Gateway). It extracts variables from a plurality of messaging protocols and stores them in the database. It also replicates local bulletin-board state variables to the associated processing nodes by composing the appropriate messages for each communication link. The message transfer can be initiated triggered by a bus event, by a local event, or by a time-triggered mechanism that uses a cyclic local or global time base.

Figure 6:
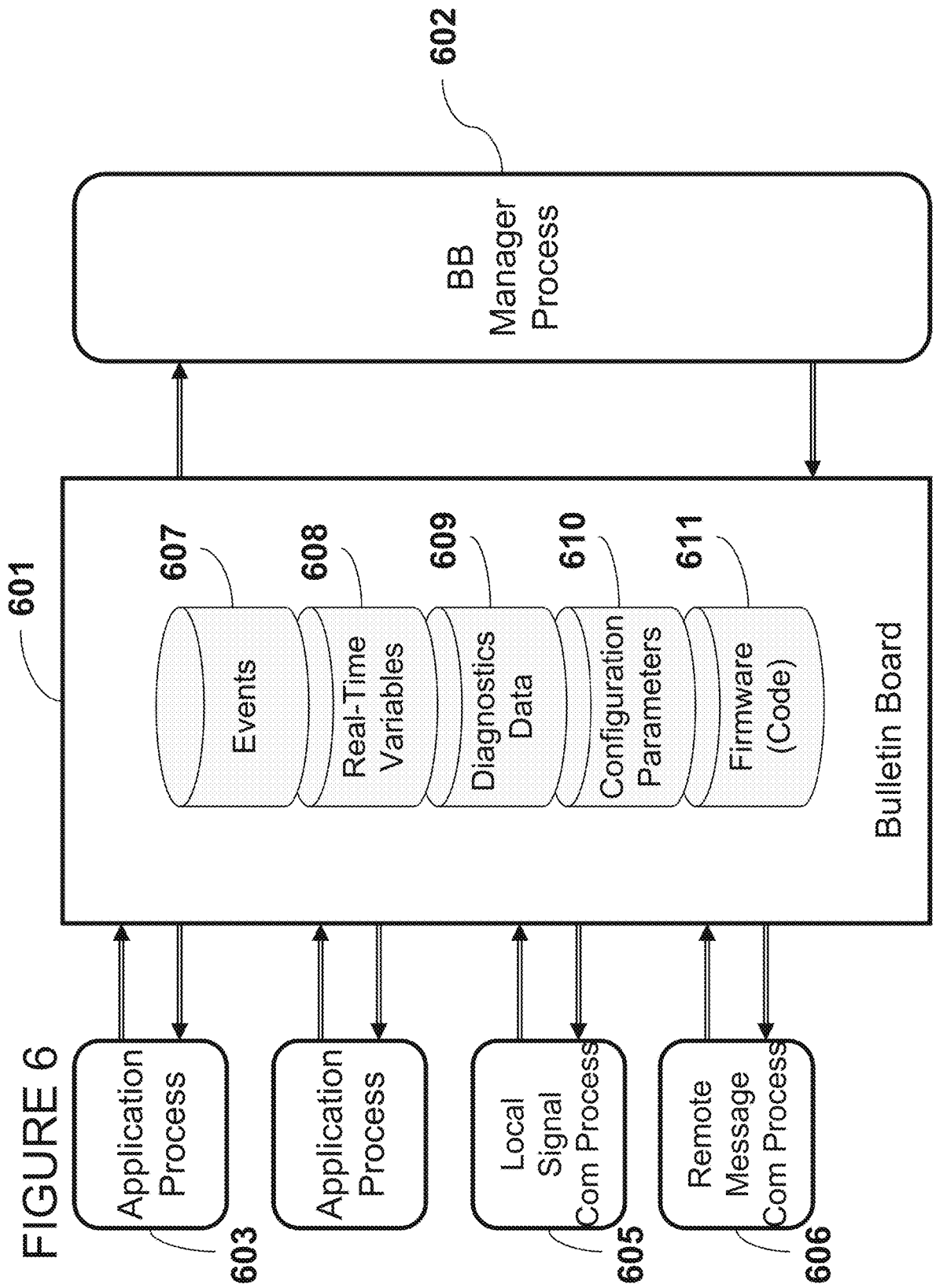
FIG. 6 is a block diagram of an embodiment of the bulletin board that describes the process interaction of one embodiment.

FIG. 6 shows the concept of an extended bulletin board or an embedded real-time database (601). In this embodiment the ECU (102) or the Gateway (101) hosts one or multiple bulletin boards with relational links between the variables in the bulletin boards. The relations are defined by data processing functions that the gateway can operate on bulletin boards to obtain new information that can be stored in yet another bulletin board.

The bulletin board (601) may contain but is not limited to events (607), real-time variables (608), diagnostics data (609), configuration parameters (610), and firmware (611) to upgrade individual components of the executable code or the entire software of a processing node. Each type of information may include one or more sections so that individual processes are not blocked if they access separate sections of data.

The memory of the bulletin board is subdivided into areas that nodes on each external network can read from and write into and other areas that an external network may only read from. The data contained in the bulletin board may be stored in volatile or non-volatile memory. Each data entry may consist of one value or an array of values that also may represent a time series.

In one embodiment, each application process (603), local signal communication process (605), remote message communication process, and the bulletin manager (602) can individually access the bulletin board using operating system functions for resource management that may include semaphores, events, signals, call-back routines, flags, etc. in an alternate embodiment of the system the bulletin-board manager controls all interaction with the bulletin-board and all applications have to pass data to the bulletin-board manager. This approach simplifies the interaction with the bulletin board, but adds delay time and jitter to the state variables.

At design time, various hierarchies of memory management can be applied. In practice it is more efficient to allow each sub network and subsystem to place system variable data into local bulletin boards. This is because many system variables are primarily used only within their subsystem or sub network. By placing local information in a shared memory (local bulletin board), it can be used by multiple processes on this processor node. A group bulletin board allows devices on a sub-network to share information with a minimum of network traffic. A system bulletin board allows access to system-wide variables and information.

Figure 7:
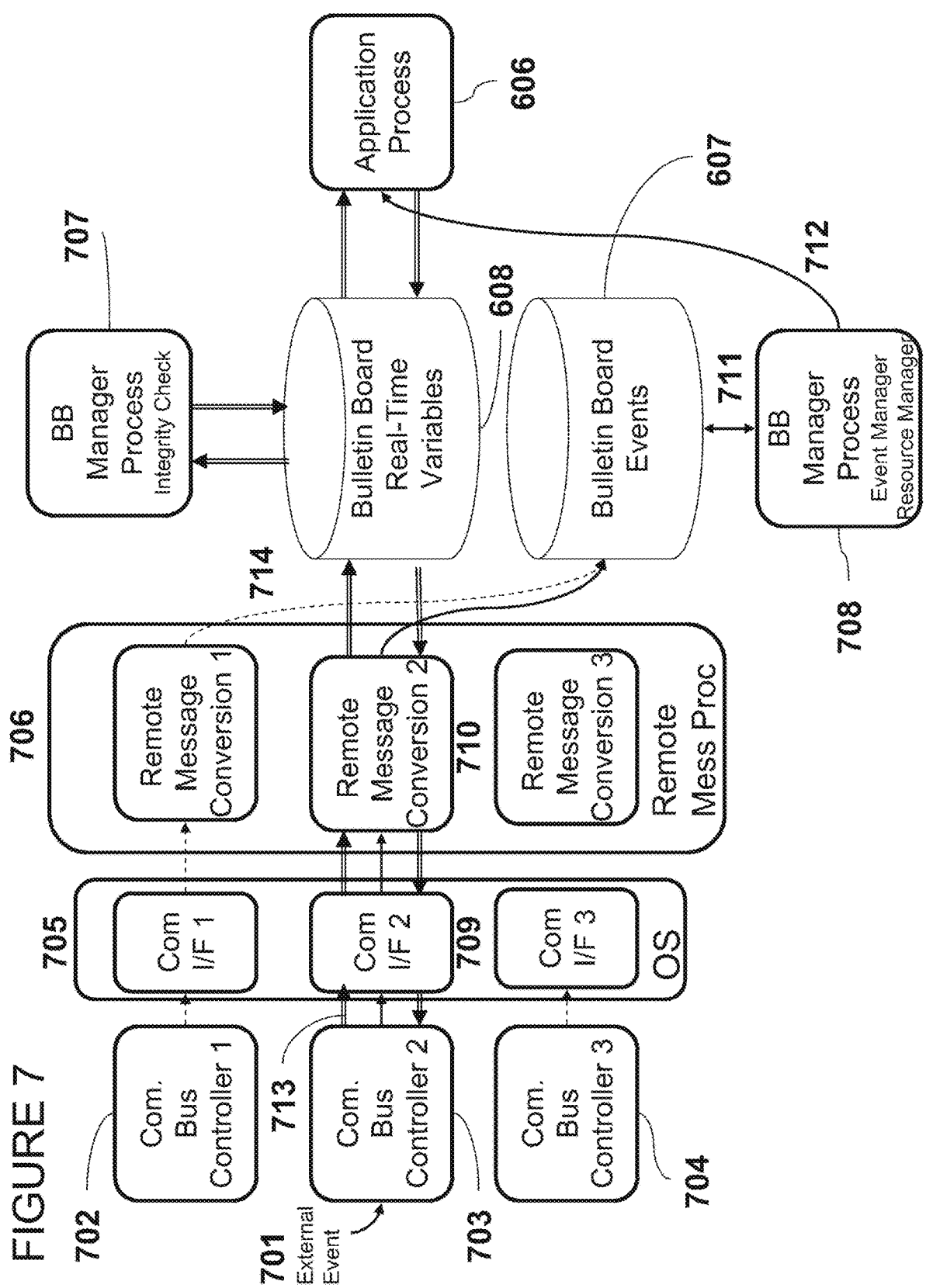
FIG. 7 is a block diagram of an embodiment of the bulletin board that describes the process interaction with multiple external communication buses as part of one embodiment.

FIG. 7 illustrates the logical architecture of the interconnection between three heterogeneous network controllers (702, 703, 704), the associate Operating System interfaces (705), the remote message communication process (706), the bulletin board (608), and the application process (606). The connection to each communication controller is fundamentally implemented at the physical interface (the wire, fiber or electromagnetic wireless interface). Each of the higher level layers (data link, network, etc.) in the communication interface (705) deals with specific features of the individual communication process. In practice these layers are typically represented in a message by "header" bits that contain information about that layer of the network being used to send the message.

Using this model, each communicated message may be processed at each layer to remove (and use) the associated header information for that level. Once all layers are processed the remaining packet data unit (PDU) represents the datum or core information carried by the overall message. In one embodiment, each communication controller has an associated communication interface and an associated remote message conversion mechanism. For instance communication bus controller 2 (703) has an associated communication interface 2 (709), and an associated remote message conversion 2 (710).

This arrangement allows the remote message process (706) to directly access information at the data link layer and interface it with the bulletin board. A network layer is not necessary. The remote message communication process (706) has a multi-network access interface (essentially a processing capability that can interpret and apply the header information for a variety of networks) and the bulletin board read/write memory access. Now, the individual processing nodes do not need to know about the existence of multiple networks. Each variable can be accessed from all connected physical networks in their proprietary format. Thus the normalization of the information has only to be handled at the gateway through replication of stored data to multiple attached networks.

Continuing with FIG. 7, the communication procedure is described. In the given example, an external event (701) on communication controller 2 (703) triggers the operating system to notify the remote message communication process (706) that data is available. The notification may be a flag, a call-back routine, an event, or any other operating signal. The associated remote message conversion method 2 (710) extracts the data (e.g. real time variables) from the message PDU and stores the data in the bulletin board (608). It may also store the associated event as variable in the bulletin board and signal the bulletin-board event manager that new data is available.

The bulletin event manager then notifies the application process (606) with the appropriate mechanism. In addition, the event manager may trigger the sampling of local signals using the local signal communication process (605) described in FIG. 6. Finally the bulletin event manager may trigger the bulletin board manager (707) to perform integrity checks or generate additional events based on the change of the state variables.

One embodiment provides a new mechanism for creating an information interconnection between two or more heterogeneous communication networks. In the context of the present description, heterogeneous networks may refer to any different communication networks with at least one aspect that is different.

The approach uses a common, or shared storage system that is connected to all of the system networks through network interfaces. A critically important feature of the bulletin board approach is that the complexity of the bulletin board grows linearly with the number of networks (as opposed to as N(N−1) for the gateway approach), and in one-to-many situations the number of message transformations is half that of the standard networking approach.

In an alternate embodiment of the remote message communication process (706) any remote process can access data via a single network interface. This approach requires a network layer in each processing node and therefore adds overhead to communications. To communicate between two heterogeneous networks, this process may then be repeated in reverse by adding back the header information for the various layers of the second network, and eventually putting the message onto the second network's physical link. The remote message communication manager (706) then can be simplified to only one message assembly and disassembly mechanism.

FIGS. 8-17 illustrate the method of operation of one embodiment of the present system, and also refer to aspects and elements one embodiment shown in FIGS. 1 through 7.

Figure 8:
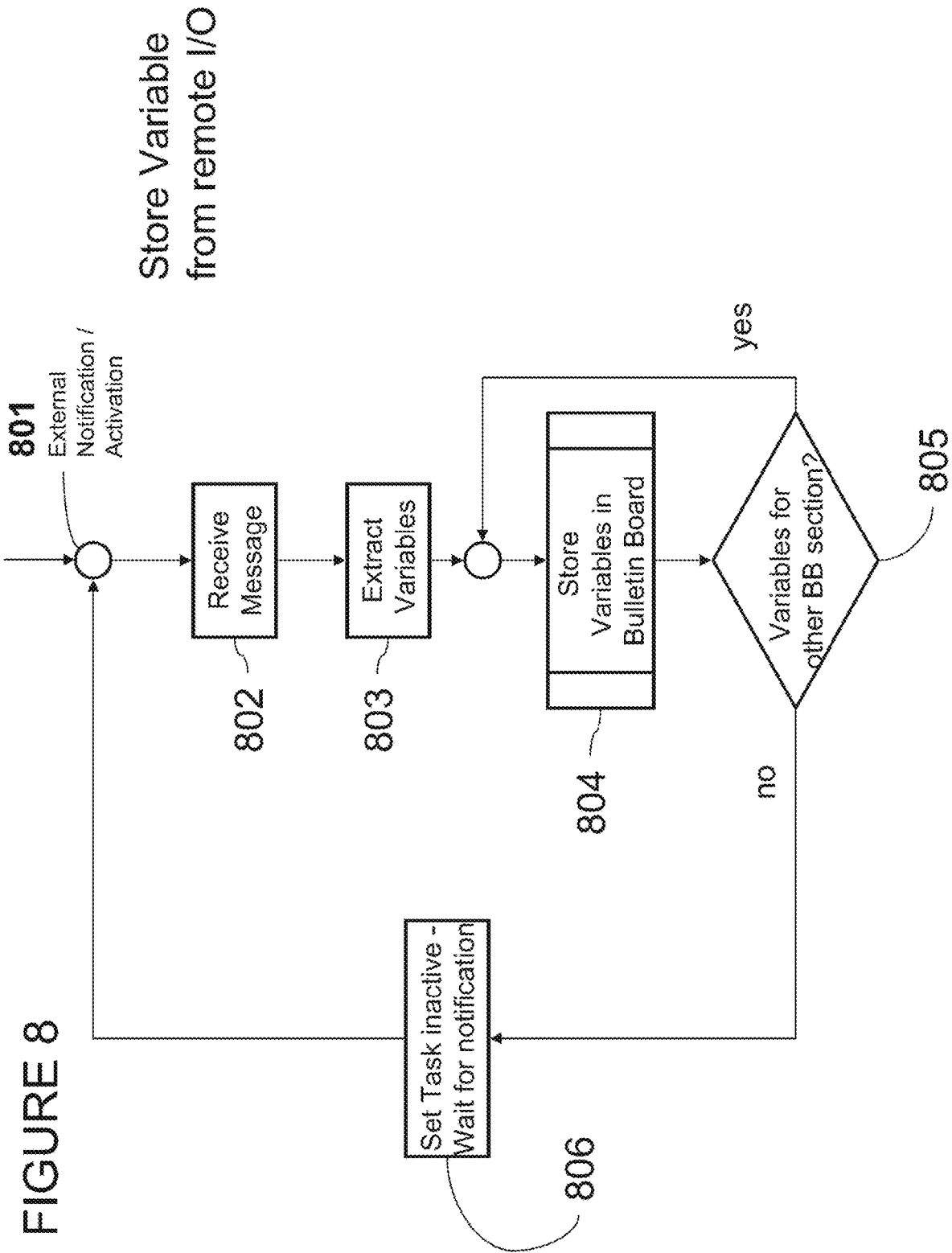
FIG. 8 is a flow chart diagram of an embodiment of the variable store from remote I/O method of one embodiment.

FIG. 8 details the remote messaging process (706) described in FIG. 7. Referring now to FIG. 8, the core process of storing data from remote processes that are communicated through multiplexed communication links, into the bulletin board is described. An external notification or task activation starts the process. Then a message (802) is received from the operating system layer.

In an alternate embodiment, the message is directly copied form the input register of the communication controller. Then the process extracts variables from the message. Additional signal adaptation may be necessary. The sub-process 804 stores the variables in the bulletin board. If the process only updates one section of the bulletin board it waits for the next message notification (806). If variables in multiple sections need to be updated, the process repeats (804).

Figure 9:
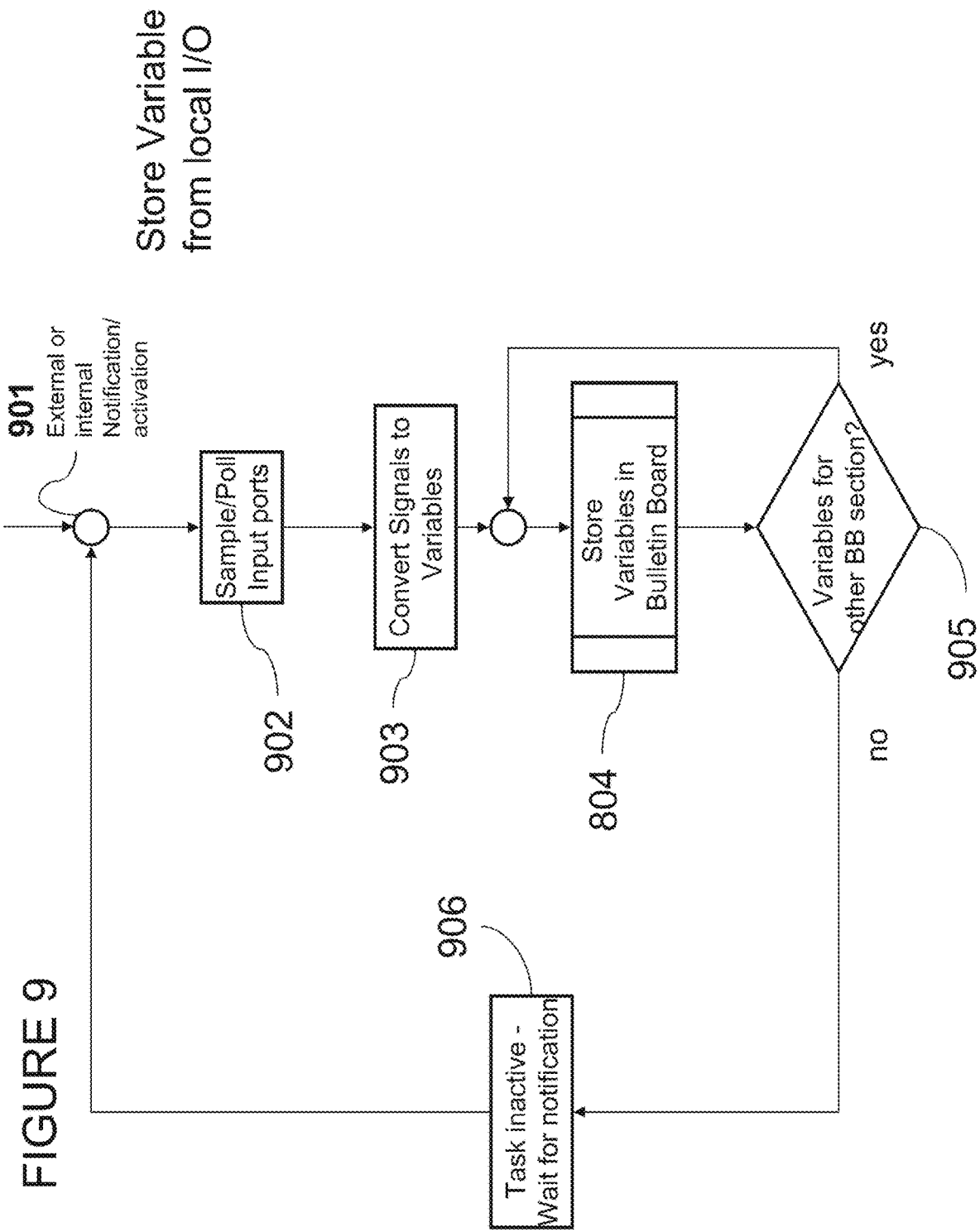
FIG. 9 is a flow chart diagram of an embodiment of the variable store from local I/O method of one embodiment.

FIG. 9 shows the data update from local input/output peripherals. The process starts with an internal or external notification or task activation. Typically this process is repeated cyclic triggered by an internal or external real-time clock. When the process is activated, it samples or polls the local input ports that may include analog and digital signals (902). Then it converts these signals to real-time variables by using the conversion parameters stored in the bulletin board. The signal conditioning parameters van either be defined at design time or adaptively updated by the application process. Then the process stored the new state variables in the bulletin board using the sub-process (804) described above.

Figure 10:
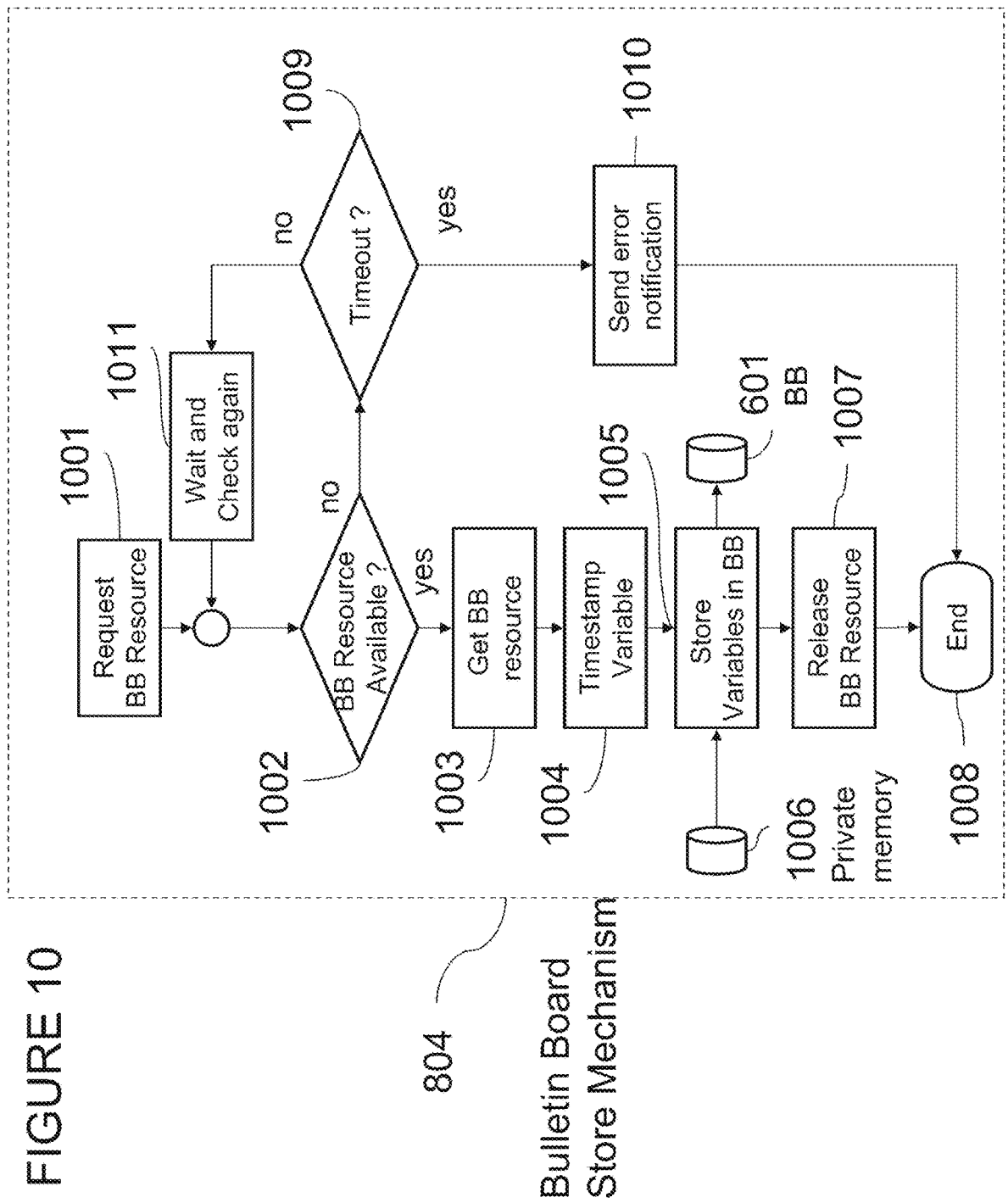
FIG. 10 is a flow chart diagram of an embodiment of the variable method of one embodiment.

FIG. 10 describes the bulletin board store procedure (804) in more detail. Before new data can be stored in the bulletin board, the procedure has to request the access right to the common resource, a section of the non-volatile or volatile memory, from the operating system (1001). This is called explicit resource management.

If the resource is available, the process gets the resource. If the resource is not available, it may try it again after a waiting period (1011) until the resource is available. After a certain time has elapsed (1009) beyond a configurable threshold, the temporal behavior of the state variable can't be captured any longer and the middle-ware may send an error notification to the associated process.

After reserving the resource (1003), the bulletin board store mechanism (804) timestamps the state variable for future temporal reference (1004). Then, the bulletin board store procedure (804) copies the variables or parameters from its private memory (1006) to the shared bulletin-board memory (601). Then it releases the bulletin board resource.

In an alternate embodiment, the bulletin board store procedure (804) has exclusive access to the bulletin board (601) and does not need operations 1002, 1003, 1007, 1009, 1010, and 1011 because the resource access is realized through implicit resource management. This can be achieved with either static task scheduling or by allowing only the bulletin board store procedure (804) to access the bulletin board (601).

Figure 11:
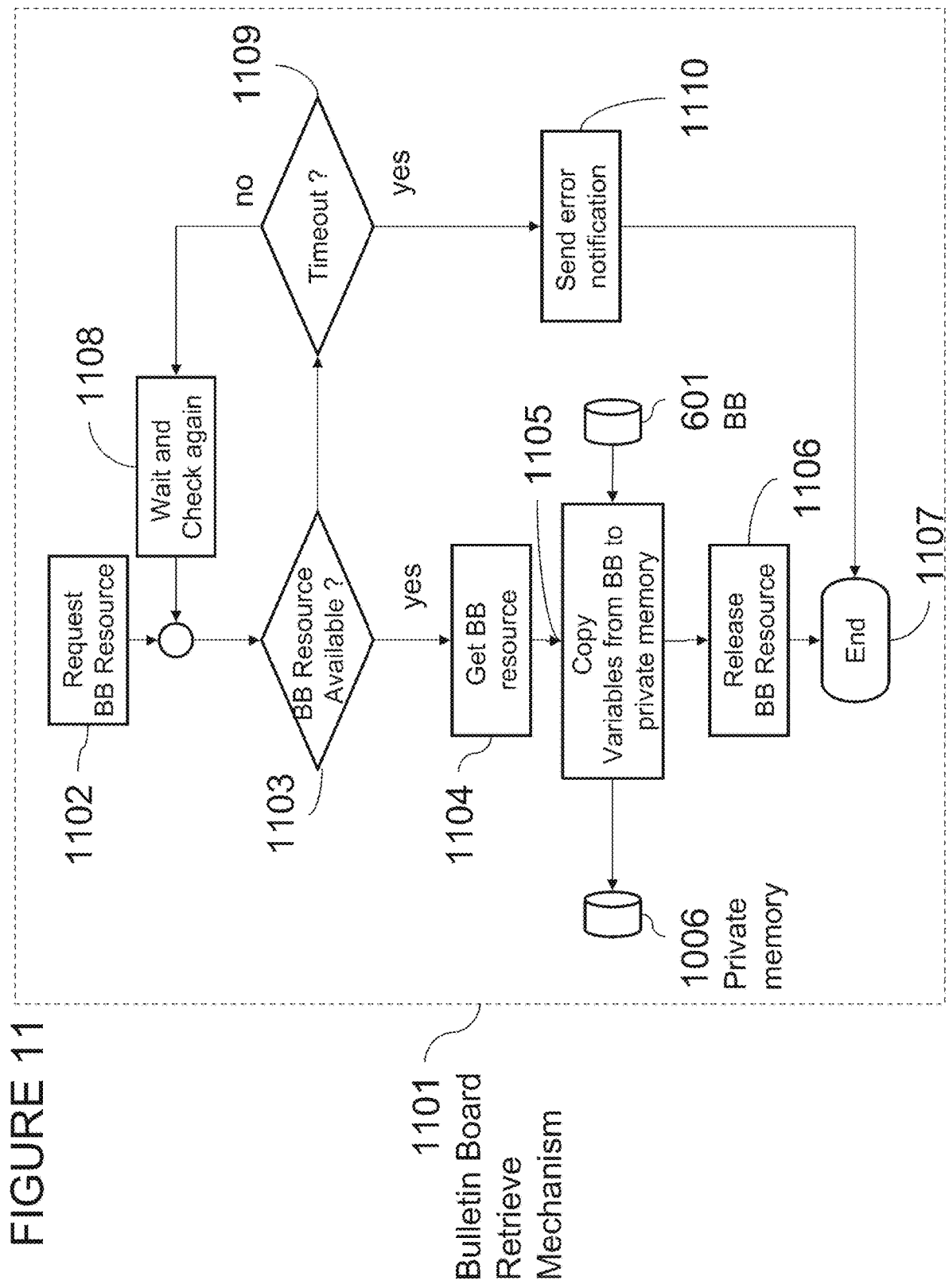
FIG. 11 is a flow chart diagram of an embodiment of the variable retrieve method of one embodiment.

FIG. 11 describes the bulletin board retrieve procedure (1101) in more detail. Before data can be retrieved from the bulletin board, the procedure has to request the access right to the common resource, a section of the non-volatile or volatile memory, from the operating system (1102).

If the resource is available, the process gets the resource. If the resource is not available, it may try it again after a waiting period (1108) until the resource is available. After a certain time has elapsed (1109) beyond a configurable threshold, the temporal behavior of the state variable can't be captured any longer and the middle-ware may send an error notification to the associated process (1110).

After reserving the resource (1104), the bulletin board retrieve mechanism (1101) copies the variables or parameters from the shared bulletin-board memory (601) to its private memory (1006). Then, it releases the bulletin board resource. In an alternate embodiment the bulletin board retrieve procedure (1101) has exclusive access to the bulletin board (601) and does not need operations 1103, 1104, 1106, 1108, 1109, and 1110. Because the resource access is realized through implicit resource management, this can be achieved with either static task scheduling or by allowing only the bulletin board retrieve procedure (1101) to access the bulletin board (601).

Figure 12:
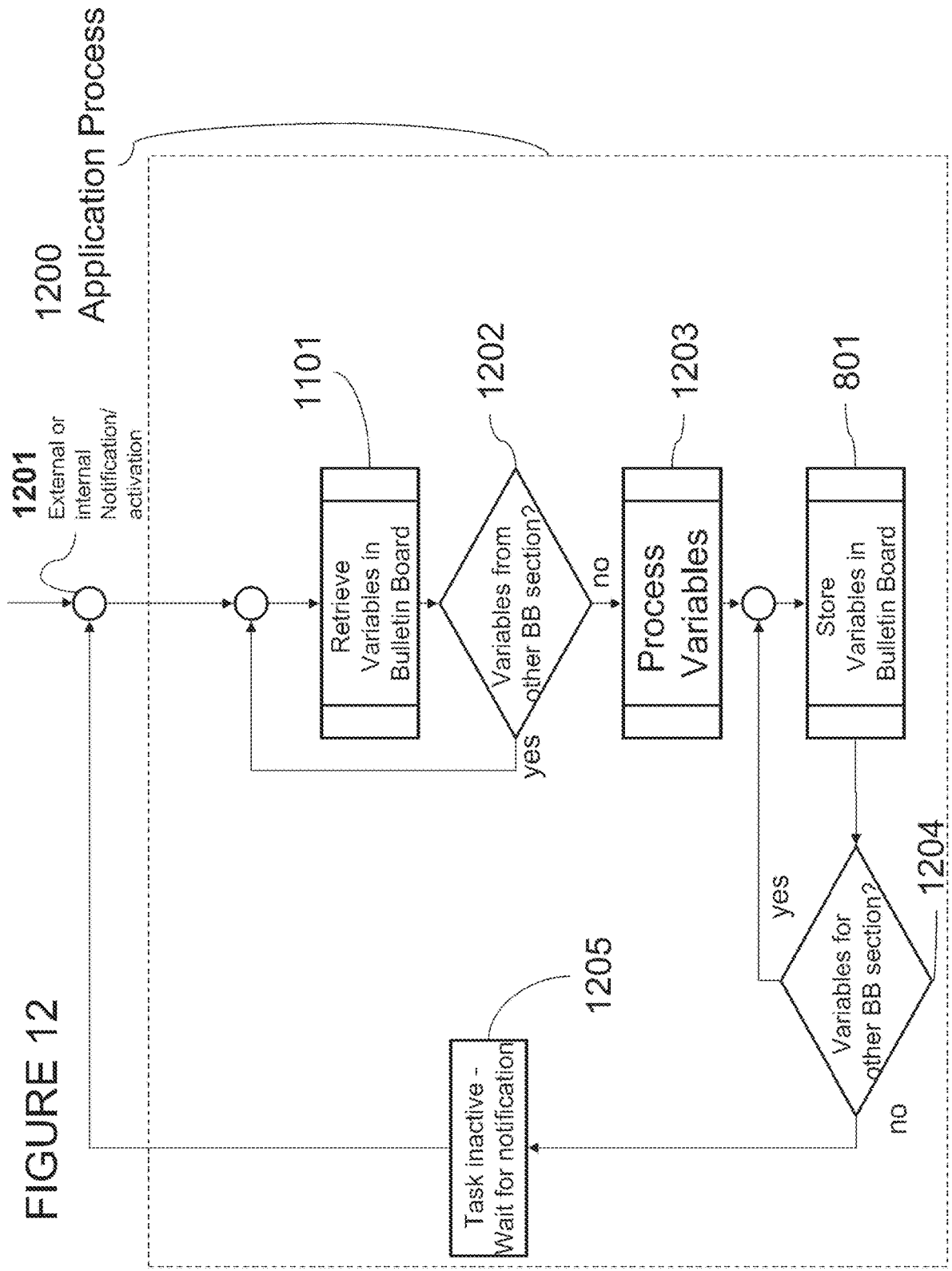
FIG. 12 is a flow chart diagram of an embodiment of the application process using the method of one embodiment

Referring to FIG. 12, the application process (1200) utilizes the bulletin board retrieve mechanism (1101) to access all parameters, events, and real-time variables from the bulletin board. Thus the application process is decoupled from the temporal behavior of the input/output variables and can be triggered by a plurality of events (1201).

The application process may retrieve one or multiple sets of variables stored in a plurality of memory sections. Then the application process processes the variables (1203) with its method. Because the method is not tied to the location of the input/output variables, the application process can be moved or replicated to a plurality of processing nodes (ECUs or Gateways). After processing the input variables and generating a set of output variables, the application process uses the bulletin board store method (801) to update one or a plurality of memory sections in the bulletin board. If the application process is a cyclic procedure, it waits until the next activation occurs (1205).

Figure 13:
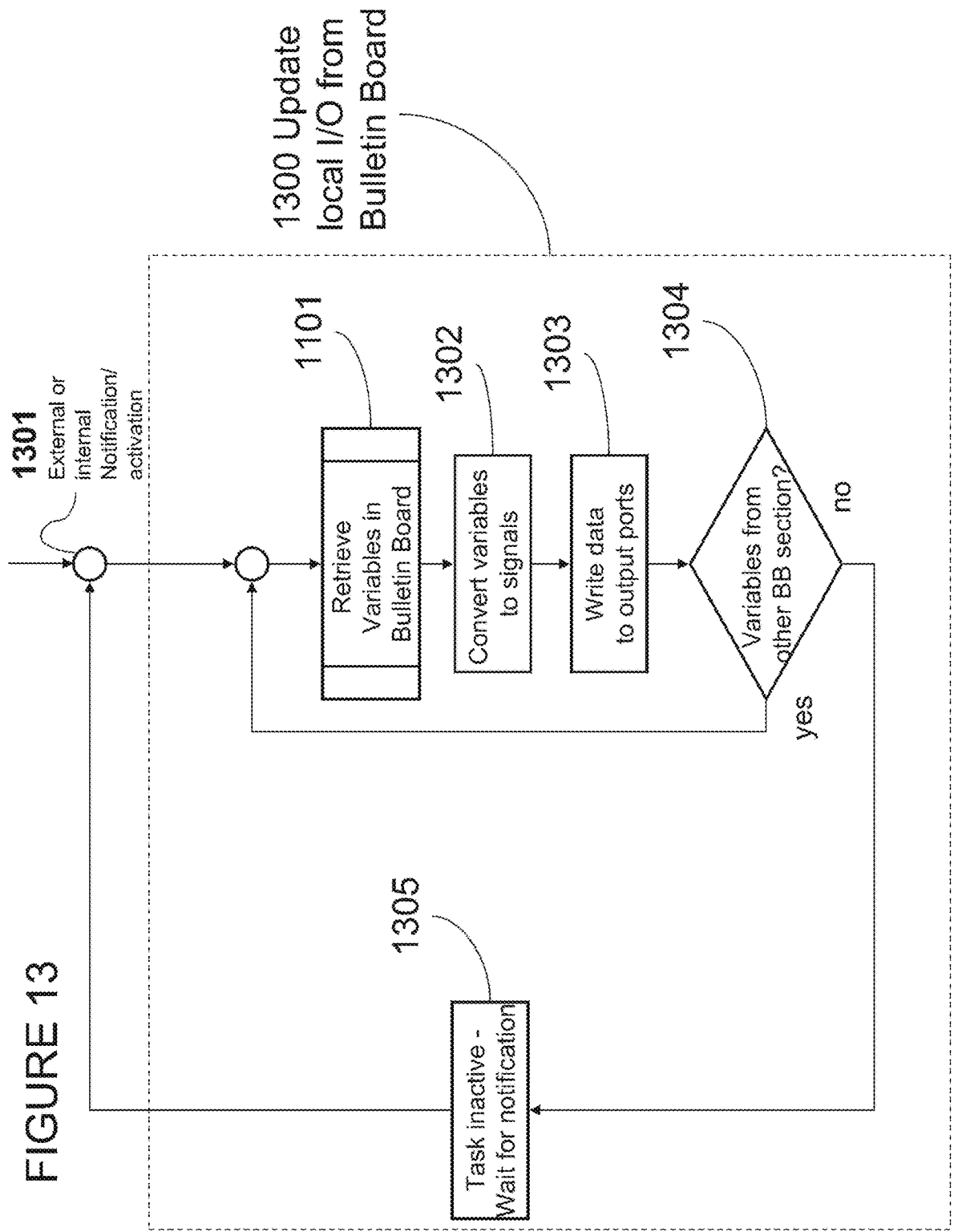
FIG. 13 is a flow chart diagram of an embodiment of the local I/O update from bulletin board method of one embodiment.

Continuing with FIG. 13, the update local I/O from bulletin board process (1300) utilizes the bulletin board retrieve mechanism (1101) to access real-time variables from the bulletin board and convert them to output signals (1302) that can be written to the output port (1303). The I/O update process may retrieve one or multiple sets of variables stored in a plurality of memory sections. If the I/O update process is a cyclic procedure, it waits until the next activation occurs (1305).

Figure 14:
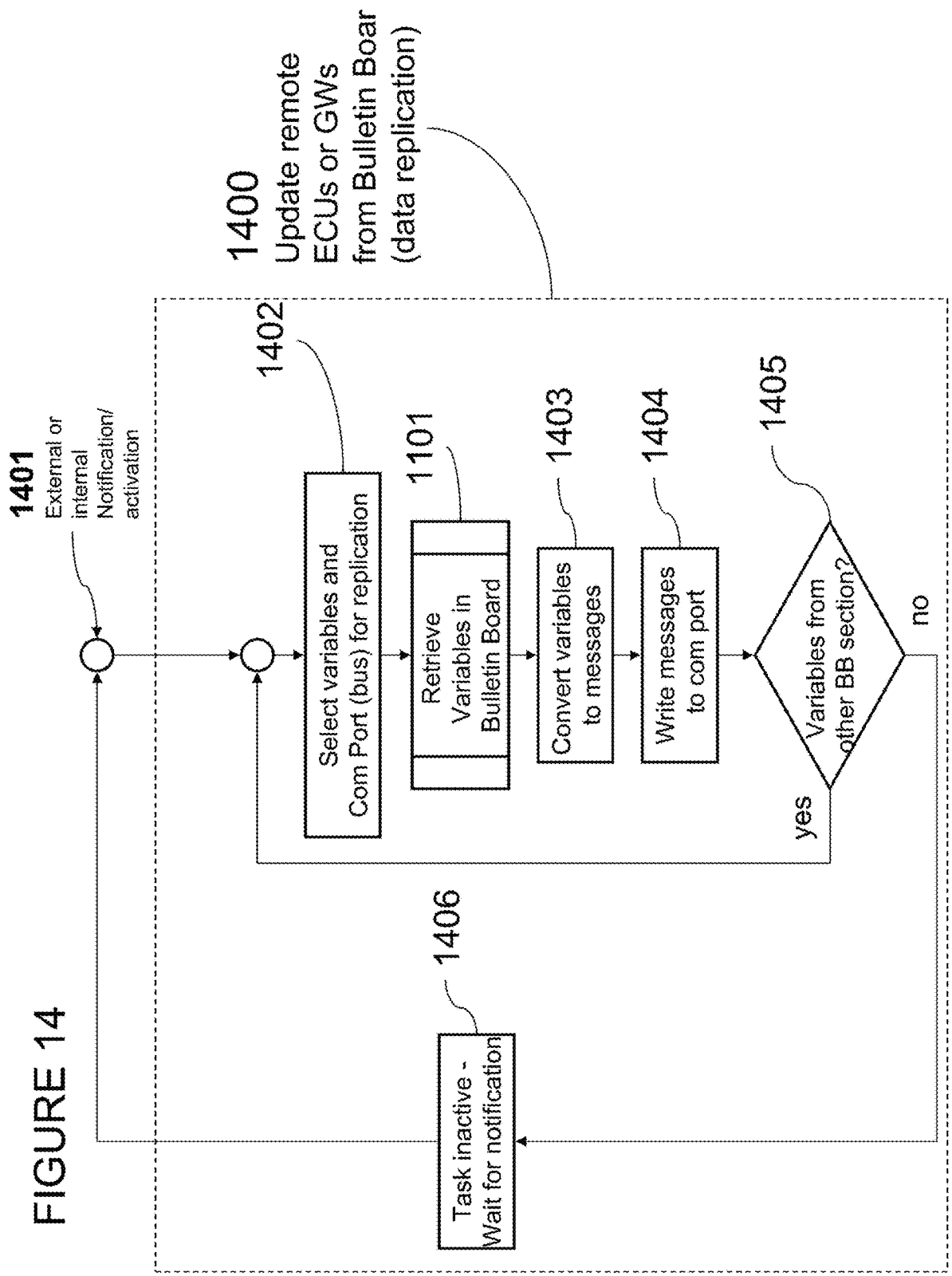
FIG. 14 is a flow chart diagram of an embodiment of the variable replication method of one embodiment.

FIG. 14 describes the data replication process (1400). This process can be triggered by a plurality of notification mechanisms, such as events, alarm signals, internal and external timers, and flags set in the bulletin board. It then selects a subset of variables to be replicated and a communication port (1402). Next it retrieves the variables from the bulletin board with mechanism (1401) and assembles the messages for the specific communication link (1403). The message may include an address or identification number for all bulletin boards and associated processing nodes (ECUs and Gateways).

Finally, it writes the messages to the communication port (1404). In an alternate embodiment, it handles the messages to the associated interface procedure of the operating system. Then it repeats the procedure, until all variables are updated on all communication ports. If the data replication process is a cyclic procedure, it waits until the next activation occurs (1405).

Figure 15:
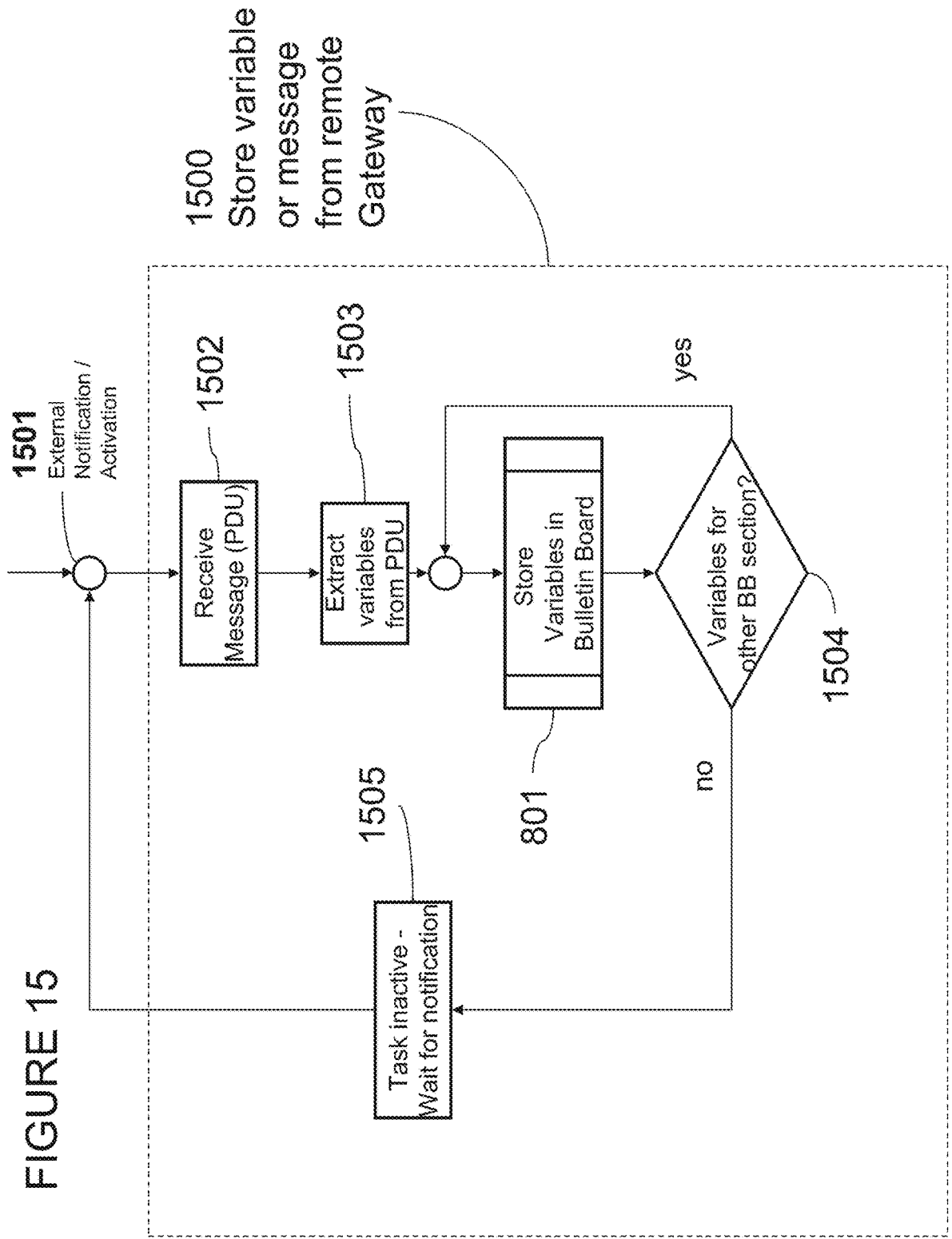
FIG. 15 is a flow chart diagram of an embodiment of the message store from remote gateway method of one embodiment.

Referring now to FIG. 15, the store message from remote processing node (gateway or ECU) process (1500) describes how replicated data is stored in the bulletin board. This process can be triggered by a plurality of notification mechanisms, such as internal or remote events, alarm signals, internal and external timers, and flags set in the bulletin board. The communication bus may also issue these notifications. The process (1500) then reads a message from the communication port (1502), selects a subset of variables to be replicated (1503), and stores the variables in the bulletin board with procedure (801). In an alternate embodiment, this procedure may also be used to store a packet data unit (PDU) in the bulletin board for later replication on the same or a different communication link.

This store and forward networking mechanism can be implemented without the need for complex networking protocols and is therefore well suited for limited processing power and memory environments. It also works in soft-real time environments when no strict temporal behavior is required. The data store operation (801) may be repeated for a plurality of bulletin board sections. If the data replication process is a cyclic procedure, it waits until the next activation occurs (1505).

Figure 16:
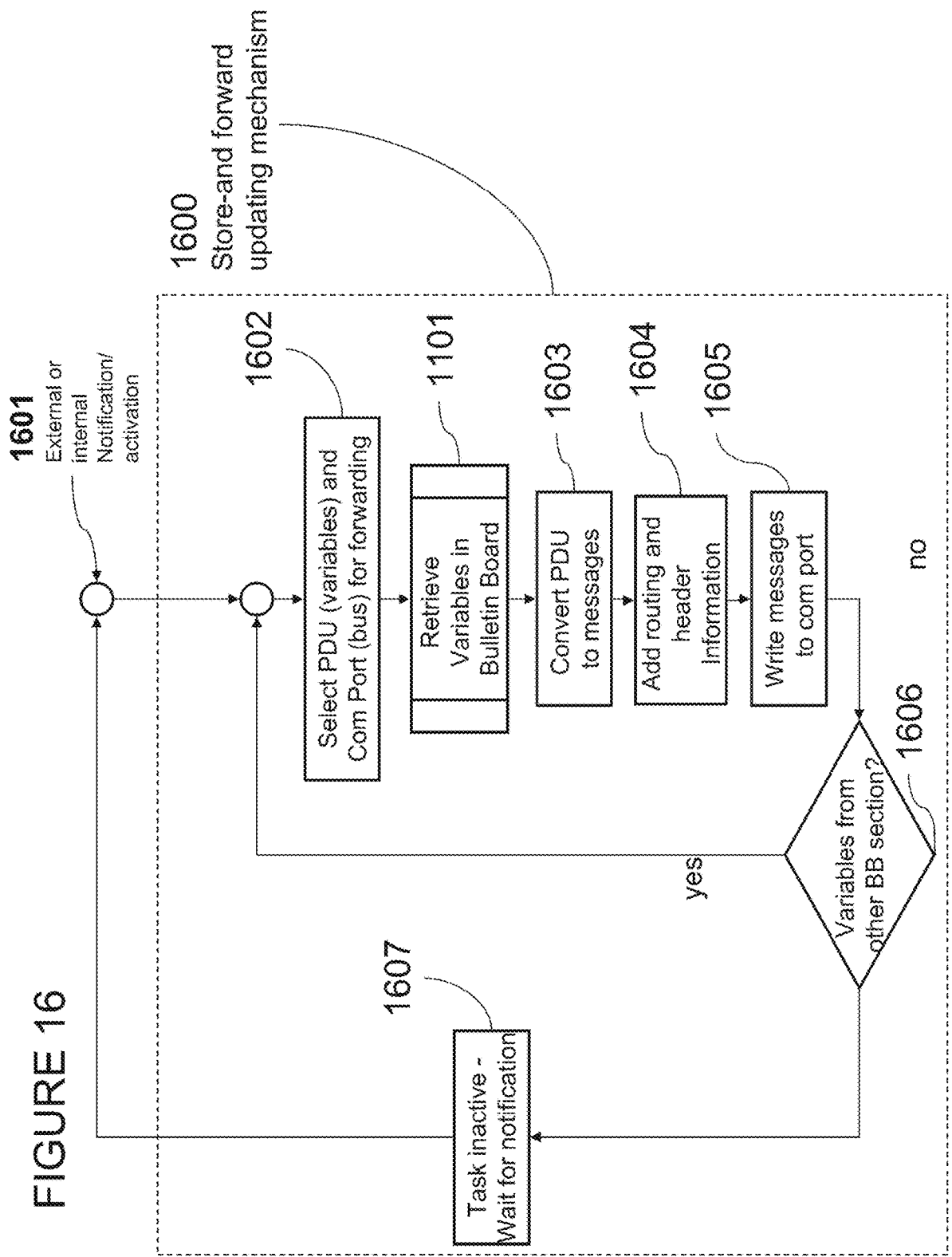
FIG. 16 is a flow chart diagram of an embodiment of the message forward to remote ECU or Gateway method of one embodiment.

Continuing now with FIG. 16, the store and forward updating mechanism (1600) replicates messages from remote processing nodes to other processing nodes from stored packet data units in the bulletin board. This process can be triggered by a plurality of notification mechanisms (1601), such as internal or remote events, alarm signals, internal and external timers, and flags set in the bulletin board. The communication bus may also issue these notifications.

The process (1600) then selects a message to be forwarded (1602) and the appropriate communication link and retrieves the PDU with the bulletin board retrieve mechanism (1101). It then adds the appropriate messages header for the communication link (1603) and may add routing information (1604). Finally the update process (1600) writes the messages to the communication port (1605). If the updating process is a cyclic procedure, it waits until the next activation occurs (1607).

FIG. 17 describes the various modes that the distributed communications and computing system (100) can be operated in. In one embodiment, the system operates in various distinct modes in order to preserve the integrity of the system and still allow for changing the architecture and behavior of the network or the roles of the individual nodes. When the distributed computing and communication system wakes up from the sleep mode (1701), it can enter a configuration and upgrade mode (1702), an emergency or debug mode (1704), or the normal real-time run mode (1703). The root node or system gateway in a distributed communication and computing system defines the mode based on the existence of external events, such as an external control command, internal events, a system failure, or failed integrity check.

Referring now to FIG. 1, the external commands may be generated from a development tool (122) or a remote device (132) that is connected via a remote gateway (131). In an alternate embodiment, each ECU (102) or virtual ECU (115) can trigger the system to enter a different operating mode.

Continuing with FIG. 17, in the configuration mode (1702), the system software and the information-sharing configuration can be updated via a secure communication link with encrypted commands Each processing node (ECU or gateway) may have security mechanisms such as a certificate that allows it to identify and authorize another entity (remote gateway, remote ECU, or development tool) to make changes to its bulletin board parameters.

The remote entity may also download a new firmware to the bulletin board. The ECU or gateway can store this new firmware in its non-volatile memory while it backs up the original image on the bulletin board for the case that the new software is not functional. In the update mode, the distributed system can also reconfigure the communication and computing infrastructure based on a new set of parameters that need to be stored in the individual bulletin boards.

In the normal run mode (1703), the system operates in the real-time information sharing mode and network configuration and certain parameters can't be changed. That protection allows defining deterministic temporal behavior on all communication links. But any processing node may enter a debug/emergency mode (1704) if a failure or other qualifying event occurs.

In the emergency mode, a processor executes an alternate procedure that maintains the temporal behavior on the communication links but may reduce or increase the amount of information shared with other processors. It also lets other processing nodes check on the integrity of sensors and actuators. In the maintenance and upgrade mode, an external system can upgrade executable code images and the bulletin-board configuration via secure communication links.

A system and method are thus provided for sharing information within a distributed embedded communications and computing system and with components outside the embedded system. The information sharing mechanism relies on a bulletin board that may include a small database operating under hard real-time conditions with minimal delays, communication latency, and jitter. The embedded database or bulletin board isolates a real-time application in a Electronic Control Unit (ECU) from various other real time applications and from input output signals in the same module (local information sharing), from event-triggered communications with applications in other modules, and from time-triggered communications with applications in other modules.

One design criteria of the database is that the temporal behavior of communications does not impact the real-time computing task and provides enough information access performance at peak time demand Typically, distributed embedded systems consist of a static structure that can be analyzed at design time. In addition to the real-time operation, the proposed method for information sharing also provides access to the parameters of the embedded system and allows for software upgrades of certain modules.

The present embodiment addresses the shortcomings of traditional computer networks with following enhancements:

1) The concept of multi-mode storage that links two or more communication networks via a bulletin board. The bulletin board is a multi-mode storage that can be thought of an extension to shared memory that can be accessed by local and remote processes at attached networks. There may be multiple hierarchical layers of bulletin boards depending on the topology of the communication system. The bulletin board increases the network efficiency by reducing the number of transactions needed to access remote variables.

2) The concept of a direct-access bulletin board that does not require a network layer translation of messages on each node of the network. Even though this approach restricts the reach of each node to only adjacent nodes and the next gateway, this still allows cross-network variable sharing though vertical real-time replication of data.

3) The concept of hierarchical bulletin board management that allows restriction of information access to certain levels in a network, but still allows the replication of information to other nodes in the network. This paradigm follows the path of reducing the information amount from the leaves of the network to central control and diagnosis hubs.

4) The concept that a gateway can host an assembly of bulletin boards or embedded database that allows operations on bulletin boards to generate events for associated processes. This extension allows definition of a set of data processing operations that would be done once in a network and would be instantly available for connected nodes. Examples for operations are sensor data state observers, diagnostics, integrity checks, fail-safe mechanisms, etc.

5) The concept that an embedded communication and computing network can run in multiple modes in order to provide for a guaranteed deterministic behavior of the system. This property can be achieved by only allowing change to the configuration and/or the functions (SW code) in a secured configuration and upgrade mode. If the network is booted in the normal operating mode, all processors execute the existing code and only allow data sharing through the bulletin boards. The emergency or debug mode lets the network run in a fail-safe reduced operation mode or in a diagnostic mode that allows inspection of the system, while it is running. For each operating mode, the gateway can store a processing image on the bulletin board. The advantage of this procedure is that only the communication hubs need to deal with secure data transfer and encryption while the peripheral nodes in the network can be relative simple in design.

6) The concept of designing the topology of a distributed computing and communication system independent of the definition of the individual functions that the network performs. Each processing task is only associated with a bulletin board, but isolated from I/O processing.

Of course, these are all optional embodiments/enhancements.

While various embodiments have been described above, it should be understood that they have been presented by the way of example only, and not limitation. Thus, the breadth and scope of a preferred embodiment should be not limited by any of the above described exemplary embodiments, but should be defined only in accordance with the following claims and their equivalents.

What is claimed is:

1. A method, comprising:
at an automotive electronic control unit:
receiving sensor information associated with a message;
based on receiving the sensor information, issuing, to a storage included in the automotive electronic control unit, a request to access the storage included in the automotive electronic control unit to store the sensor information and, based on issuing the request, determining whether the storage is available to store the sensor information;
determining whether a value tracked since the issuance of the request has been reached indicating that the storage has not been available in association with the value tracked since the issuance of the request;
based on the storage included in the automotive electronic control unit being determined, based on issuing the request, to not be available and the value tracked since the issuance of the request having not been reached indicating that the storage has not been available in association with the value tracked since the issuance of the request, issuing, to the storage included in the automotive electronic control unit, another request to access the storage included in the automotive electronic control unit to store the sensor information;
based on the storage included in the automotive electronic control unit being determined, based on issuing the request or the another request, to not be available and the value tracked since the issuance of the request having been reached, sending an error notification; and
based on the storage included in the automotive electronic control unit being determined, based on issuing the request or the another request, to be available, storing the sensor information utilizing the storage.

2. The method as recited in claim 1, wherein the sensor information reaches a destination in less than one second.

3. The method as recited in claim 1, wherein the sensor information reaches a destination in less than a millisecond.

4. The method as recited in claim 1, wherein a duration between the sensor information being received and being transmitted is less than one second.

5. The method as recited in claim 1, wherein a duration between the sensor information being received and transmitting being completed is less than a millisecond.

6. The method as recited in claim 1, wherein the sensor information is transmitted from the automotive electronic control unit in less than a millisecond from a time when the message is received at the automotive electronic control unit.

7. The method as recited in claim 6, wherein at least one of:
the storage includes volatile memory;

the storage includes non-volatile memory;
the storage includes a storage resource;
the sensor information includes original data received from a sensor or derived data derived from original data received from the sensor;
the value is time-related;
the value is a timeout;
the value includes a duration value;
the value does not include a duration value;
the value is configurable;
the value is a threshold;
the transmitting includes sharing;
the information is transmitted with requiring storage of the information prior to the transmitting;
the information is transmitted without a limitation that the information be transmitted without requiring storage of the information prior to the transmitting;
the determining whether the storage is available to store the sensor information, is not performed for a message in the automotive electronic control unit in conjunction with the message being received by the automotive electronic control unit;
the determining whether the storage is available to store the sensor information, is not performed for a message in the automotive electronic control unit;
the determining whether the storage is available to store the sensor information, is not performed in conjunction with the message being received by the automotive electronic control unit;
the request includes a storage resource request;
the issuing of the request is not performed for a message in the automotive electronic control unit in conjunction with the message being received by the automotive electronic control unit;
the issuing of the request is not performed for a message in the automotive electronic control unit;
the issuing of the request is not performed for a message in the automotive electronic control unit, but rather for the information thereof; or
the issuing of the request is not performed in conjunction with the message being received by the automotive electronic control unit.

8. The method as recited in claim 1, wherein automotive sensor data is transmitted between heterogeneous networks including at least one of a Controller Area Network, a Flexray network, or a Local Interconnect Network.

9. An apparatus, comprising:
an automotive electronic control unit including a memory storage comprising instructions, and at least one hardware processor in hardwired communication with the memory storage, wherein the at least one hardware processor executes the instructions for:
identifying sensor information associated with a message received utilizing a first network protocol associated with a first network;
in response to identifying the sensor information, issuing, by the at least one hardware processor and to a storage included in the automotive electronic control unit, a request to access the storage included in the automotive electronic control unit to store the sensor information and, in response to issuing the request, determining whether the storage is available to store the sensor information;
determining whether a value tracked since the issuance of the request has been reached;
in the event the storage included in the automotive electronic control unit is determined, in response to issuing the request, to not be available and the value tracked since the issuance of the request has not been reached, issuing, by the at least one hardware processor to the storage included in the automotive electronic control unit, another request to access the storage included in the automotive electronic control unit to store the sensor information;
in the event the storage included in the automotive electronic control unit is determined, in response to issuing the another request, to not be available and the value tracked since the issuance of the request has been reached, sending an error notification; and
in the event the storage included in the automotive electronic control unit is determined, in response to issuing the request or the another request, to be available, storing the sensor information utilizing the storage;
wherein the apparatus is operable such that the sensor information is capable of being transmitted in less than one second utilizing a second network protocol associated with a second network, where the first network is one of a Controller Area Network, a Flexray network, or a Local Interconnect Network, and the second network is another one of the Controller Area Network, the Flexray network, or the Local Interconnect Network.

10. The apparatus as recited in claim 9, wherein the apparatus is operable such that network layer translation is capable of being avoided.

11. The apparatus as recited in claim 9, wherein the apparatus is configured for sharing automotive sensor data received via the first network for use in connection with an automotive device on the second network, in less than the one second.

12. The apparatus as recited in claim 9, wherein the apparatus is configured for sharing automotive sensor data received via the first network for use in connection with an automotive actuator on the second network, in less than a millisecond.

13. The apparatus as recited in claim 9, wherein the apparatus is operable such that the request and the another request are identical.

14. The apparatus as recited in claim 9, wherein the apparatus is operable such that the request and the another request are the same.

15. The apparatus as recited in claim 9, wherein the apparatus is operable such that the sensor information excludes all header bits of the message.

16. The apparatus as recited in claim 9, wherein the apparatus is operable such that the sensor information excludes at least a portion of any header bits of the message.

17. The apparatus as recited in claim 9, wherein the apparatus is operable such that the storage includes a bulletin board.

18. The apparatus as recited in claim 9, wherein the apparatus is operable such that the error notification is sent, when the storage included in the automotive electronic control unit is determined, in response to issuing the request, to not be available and the value tracked since the issuance of the request has been reached.

19. The apparatus as recited in claim 9, wherein the apparatus is operable such that the error notification is sent, when the storage included in the automotive electronic control unit is determined, in response to issuing the another request, to not be available and the value tracked since the issuance of the request has been reached.

20. The apparatus as recited in claim 9, wherein the apparatus is operable such that the error notification is sent, when the storage included in the automotive electronic control unit is determined, in response to issuing the request and the another request, to not be available and the value tracked since the issuance of the request has been reached.

21. A non-volatile or volatile computer-readable medium of an automotive electronic control unit for storing a computer program product including code that, when executed by at least one hardware processor included in the automotive electronic control unit in communication with the computer-readable medium, is for:
- receiving sensor information associated with a message received utilizing a first network protocol associated with a first network;
- in response to receiving the sensor information, issuing, by the at least one hardware processor and to a storage included in the automotive electronic control unit, a request to access the storage included in the automotive electronic control unit, for determining whether the storage included in the automotive electronic control unit is available to store the sensor information;
- determining whether a time-related value tracked after the issuance of the request has been reached in association with the determination whether the storage is available;
- when the storage included in the automotive electronic control unit is determined to not be available and the value associated with the determination whether the storage is available has not been reached, issuing, by the at least one hardware processor to the storage included in the automotive electronic control unit, another request to access the storage included in the automotive electronic control unit to store the sensor information;
- when the storage included in the automotive electronic control unit is determined to not be available and the value associated with determination whether the storage is available has been reached, ceasing repeating issuance of another request; and
- when the storage included in the automotive electronic control unit is determined to be available, storing the sensor information utilizing the storage;
- wherein the computer program product is operable such that the sensor information is capable of being transmitted in less than one second utilizing the automotive electronic control unit that remains in hardwired communication with the first network and a second network.

22. The computer-readable medium as recited in claim 21, wherein the computer program product is operable such that the sensor information reaches a destination on the second network in less than one second.

23. The computer-readable medium as recited in claim 21, wherein the computer program product is operable such that the sensor information reaches a destination on the second network in less than a millisecond.

24. The computer-readable medium as recited in claim 21, wherein the computer program product is operable such that a duration between the sensor information being received and the transmitting being completed is less than one second.

25. The computer-readable medium as recited in claim 21, wherein the computer program product is operable such that a duration between the sensor information being received and the transmitting being completed is less than a millisecond, where the first network is one of a Controller Area Network, a Flexray network, or a Local Interconnect Network, and the second network is another one of the Controller Area Network, the Flexray network, or the Local Interconnect Network.

26. The computer-readable medium as recited in claim 21, wherein the computer program product is operable such that the transmitting of the sensor information is completed in less than a millisecond, where the first network is one of a Controller Area Network, a Flexray network, or a Local Interconnect Network, and the second network is another one of the Controller Area Network, the Flexray network, or the Local Interconnect Network.

27. The computer-readable medium as recited in claim 21, wherein the computer program product is configured for transmitting the sensor information in the form of automotive sensor data received via the first network for use in connection with an automotive device on the second network, in less than one millisecond.

* * * * *